United States Patent
Kayano et al.

(10) Patent No.: US 8,005,451 B2
(45) Date of Patent: *Aug. 23, 2011

(54) FILTER CIRCUIT AND RADIO COMMUNICATION APPARATUS

(75) Inventors: Hiroyuki Kayano, Fujisawa (JP); Masahiro Tanabe, Tokyo (JP); Mitsuyoshi Shinonaga, Kawasaki (JP); Noritsugu Shiokawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 741 days.

This patent is subject to a terminal disclaimer.

(21) Appl. No.: 11/856,321

(22) Filed: Sep. 17, 2007

(65) Prior Publication Data

US 2008/0139142 A1  Jun. 12, 2008

(30) Foreign Application Priority Data

Dec. 8, 2006  (JP) .................................. 2006-332415

(51) Int. Cl.
*H04B 1/10* (2006.01)

(52) U.S. Cl. ........ 455/286; 455/287; 455/339; 327/555; 327/556; 327/557

(58) Field of Classification Search .................. 330/292, 330/306; 455/91, 424, 425, 456.5, 456.6, 455/561, 550.1, 575.1, 7, 82, 83, 78, 106; 333/168, 20, 206, 1.1, 132, 187, 133, 176, 333/202, 174, 191
See application file for complete search history.

(56) References Cited

U.S. PATENT DOCUMENTS 4,159,454 A * 6/1979 Willmore .................... 333/20
4,910,481 A * 3/1990 Sasaki et al. ................. 333/134
4,951,060 A * 8/1990 Cohn ............................ 342/175
5,212,813 A * 5/1993 Renaud ......................... 455/82
5,701,595 A * 12/1997 Green, Jr. ...................... 455/83

(Continued)

FOREIGN PATENT DOCUMENTS

JP  38-13458  7/1963

(Continued)

OTHER PUBLICATIONS

Mitsuru Honjoh et al., "Synthesis of Microwave Circuits by Normal Mode Expansion—Synthesis of Rectangular Waveguide Filter With Dielectric Sheet Window", IEICE Technical Report, MW82-54, 1982, pp. 9-16.

(Continued)

*Primary Examiner* — Duc Nguyen
*Assistant Examiner* — Charles Chow
(74) *Attorney, Agent, or Firm* — Oblon, Spivak, McClelland, Maier & Neustadt, L.L.P.

(57) ABSTRACT

There is provided with a filter circuit, including: an input terminal configured to input signals; a band stop filter configured to have a center frequency of input signals from the input terminal in a stop band and configured to reflect signals in the stop band that is included in the input signals and pass signals outside the stop band; a band pass filter configured to have a pass band including the stop band, and configured to pass signals in the pass band out of the signals having passed through the band stop filter; a synthesis circuit configured to synthesize the signals reflected on the band stop filter and the signals having passed through the band pass filter to obtain synthesis signals; and an output terminal configured to output the synthesis signals.

4 Claims, 25 Drawing Sheets

U.S. PATENT DOCUMENTS

| | | | |
|---|---|---|---|
| 5,982,824 A * | 11/1999 | Ann | 375/345 |
| 6,163,237 A * | 12/2000 | Toda et al. | 333/206 |
| 6,225,943 B1 * | 5/2001 | Curley et al. | 342/137 |
| 6,313,713 B1 * | 11/2001 | Ho et al. | 333/1.1 |
| 6,317,003 B1 * | 11/2001 | Kobayashi | 330/306 |
| 6,518,854 B2 | 2/2003 | Kayano et al. | |
| 6,567,647 B1 * | 5/2003 | Epperson | 455/83 |
| 6,643,522 B1 * | 11/2003 | Young | 455/552.1 |
| 6,759,930 B2 | 7/2004 | Kayano et al. | |
| 6,914,497 B2 | 7/2005 | Sano et al. | |
| 6,993,286 B2 * | 1/2006 | Zhen et al. | 455/7 |
| 6,993,356 B2 * | 1/2006 | Herzinger | 455/522 |
| 6,996,900 B2 * | 2/2006 | Hattori | 29/846 |
| 7,349,674 B2 * | 3/2008 | Jung et al. | 455/82 |
| 7,373,115 B2 * | 5/2008 | Monroe | 455/82 |
| 2004/0041635 A1 | 3/2004 | Sano et al. | |
| 2005/0285701 A1 | 12/2005 | Kayano et al. | |
| 2006/0152303 A1 * | 7/2006 | Liang et al. | 333/134 |
| 2007/0001787 A1 | 1/2007 | Kayano | |
| 2008/0139142 A1 | 6/2008 | Kayano et al. | |

FOREIGN PATENT DOCUMENTS

| | | |
|---|---|---|
| JP | 2-215202 | 8/1990 |
| JP | 11-186812 | 7/1999 |
| JP | 2001-345601 | 12/2001 |
| JP | 3380165 | 12/2002 |
| JP | 2004-96399 | 3/2004 |
| JP | 2005-33264 | 2/2005 |
| JP | 2006-140068 | 1/2006 |

OTHER PUBLICATIONS

Takayuki Kato et al., "Studies on the equivalent circuits of dual-mode rectangular waveguide filters using HFSS and MDS", Technical Report of IEICE, MW98-85, Sep. 1998, pp. 73-80 (with English Abstract).

U.S. Appl. No. 12/199,248, filed Aug. 27, 2008, Kayano.

* cited by examiner

FILTER CIRCUIT AND RADIO COMMUNICATION APPARATUS

CROSS-REFERENCE TO RELATED APPLICATIONS

This application is based upon and claims the benefit of priority from the prior Japanese Patent Applications No. 2006-332415 filed on Dec. 8, 2006, the entire contents of which are incorporated herein by reference.

BACKGROUND OF THE INVENTION

1. Field of the Invention

The present invention relates to a filter circuit and radio communication apparatus, and to a filter circuit for band limitation connected to a post-stage of a power amplifier for use in a transmission section of a communication apparatus using radio transmission, for example.

2. Related Art

As shown in FIG. 26, a conventional filter circuit is configured by cascade connection of resonators 1107(1) to 1107(n). An equivalent circuit of each of the resonators consists of an inductor and a capacitor, and a resistance is added when the effect of loss is considered. A resonance frequency of the resonator in the case of including no resistance is given by the following expression:

$$F0 = (L \times C)^{-1/2}$$

where "L" and "C" are respectively an inductance and a capacitance of the resonator. In the filter circuit, the resonators are connected in cascade and inter-resonator coupling coefficients ($m_{12}$, $m_{23}$, . . . , $M_{n-1,n}$ in FIG. 26) indicating coupling amounts of the resonators and a value of an external portion Q (Qe in FIG. 26) indicating an amount by which the resonators are excited in input/output portions are adequately determined, so that a pass frequency range and a stop band attenuation as a filter circuit can be determined. Reference numeral 1101 denotes an input terminal, and reference numeral 1106 denotes an output terminal. Since a current is propagated through each resonator in the filter circuit where the resonators are connected in cascade, currents of all frequency components pass through the resonators. Therefore, in a case where resonators are configured using a material having a limitation on a value of current per unit area which can pass in a superconducting state, such as a superconductor, power handling capability of each of the resonators is an important parameter for passing large power through the filter circuit, and a method is under study in which countermeasures are taken to prevent concentration of currents in the resonators by applying a disk shape or wide lines or some other means so as to improve power handling capability. However, there is a problem with the superconducting resonator in that current concentration occurs to a large degree since a value of the external portion Q is very high and it is thus not possible to obtain large power handling capability merely by devising the resonator shape.

Meanwhile, there is a method of configuring a filter circuit by parallel connection of resonators as a method of dispersing power into each resonator in the filter circuit to realize filter characteristics as shown in FIG. 27 (JP-A 2001-345601 (Kokai), JP-A 2004-96399 (Kokai)). With such parallel configuration of resonators, inputted power is distributed into resonators 1108(1) to 1108(n), to improve a power handling capability as a whole. For making parallel configuration of resonators, the resonators are configured so as to each have a different frequency ($f_1, f_2, \ldots, f_n$ in FIG. 27) and synthesized such that adjacent resonators having resonance frequencies are in reverse phases to each other, thereby to realize the filter characteristics. In the figure, "-" in reference symbol "-$m_2$" denotes reverse phase coupling. There is a method of combining a superconducting filter with a normal conducting filter in a filter configuration using the above-mentioned configuration (Japanese Patent No. 3380165, JP-A 11-186812 (Kokai)). In Japanese Patent No. 3380165, a superconducting filter and a normal conducting filter are arranged in parallel. However, there is a problem in that, when a large current is inputted, power is divided into each filter and then separated only into power to be reflected and power to pass in each filter, thereby requiring the superconducting filter to also have large power handling capability.

SUMMARY OF THE INVENTION

According to an aspect of the present invention, there is provided with a filter circuit, comprising:
an input terminal configured to input signals;
a band stop filter configured to have a center frequency of input signals from the input terminal in a stop band and configured to reflect signals in the stop band that is included in the input signals and pass signals outside the stop band;
a band pass filter configured to have a pass band including the stop band, and configured to pass signals in the pass band out of the signals having passed through the band stop filter;
a synthesis circuit configured to synthesize the signals reflected on the band stop filter and the signals having passed through the band pass filter to obtain synthesis signals; and
an output terminal configured to output the synthesis signals.

According to an aspect of the present invention, there is provided with a filter circuit, comprising:
an input terminal configured to input signals;
a band stop filter configured to have a stop band that includes a center frequency of input signals from the input terminal and configured to reflect signals in the stop band that is included in the signals and pass signals outside the stop band;
a resonator group circuit configured to pass signals in a desired band out of the signals having passed through the band stop filter by use of a plurality of resonators;
a synthesis circuit configured to synthesize the signals having passed through the resonator group circuit and the signals reflected on the band stop filter to obtain synthesis signals; and
an output terminal configured to output the synthesis signals.

According to an aspect of the present invention, there is provided with a filter circuit, comprising:
an input terminal configured to input signals;
a first four-port element configured to
receive input signals from the input terminal at a terminal A, divide the input signals received at the terminal A, and send each divided signals from a terminal B and a terminal C, and
synthesize signals given to the terminal B and the terminal C and send synthesized signals from a terminal D;
a first band stop filter configured to have a center frequency of the input signals in a stop band and configured to reflect signals in the stop band that is included in the divided signals sent from the terminal B to the terminal B and pass signals outside the stop band;
a second band stop filter configured to have same stop band as the stop band of the first band stop filter and configured to reflect signals in the stop band that is included in the divided signals sent from the terminal C to the terminal C and pass signals outside the stop band;

a first resonator group circuit configured to pass signals in a desired band out of the signals having passed through the first band stop filter by use of a first plurality of resonators;

a second resonator group circuit configured to pass signals in the desired band out of the signals having passed through the second band stop filter by use of a second plurality of resonators each having same resonance frequency as that of each of the first plurality of resonators;

a second four-port element configured to receive signals in the stop band synthesized from the signals in the stop band reflected on the first and second band stop filters from the terminal D of the first four-port element at a terminal E, divide received signals in the stop band, and send each divided signals in the stop band from a terminal F and a terminal G, and synthesize signals given to the terminal F and the terminal G and send synthesized signals from a terminal H;

a third band stop filter configured to have same stop band as that of the first band stop filter and configured to pass the signals in the desired band having passed through the first resonator group circuit to the terminal F and reflect the divided signals in the stop band sent from the terminal F to the terminal F;

a fourth band stop filter configured to have same stop band as that of the first band stop filter and configured to pass the signals in the desired band having passed through the second resonator group circuit to the terminal G and reflect the divided signals in the stop band sent from the terminal G to the terminal G; and an output terminal configured to output signals synthesized from the signals in the desired-band passed through the third and fourth band stop and sent from the terminal H, and signals synthesized from the divided signals in the stop band reflected on the third and fourth band stop and sent from the terminal H.

DETAILED DESCRIPTION OF THE INVENTION

Figure 1:
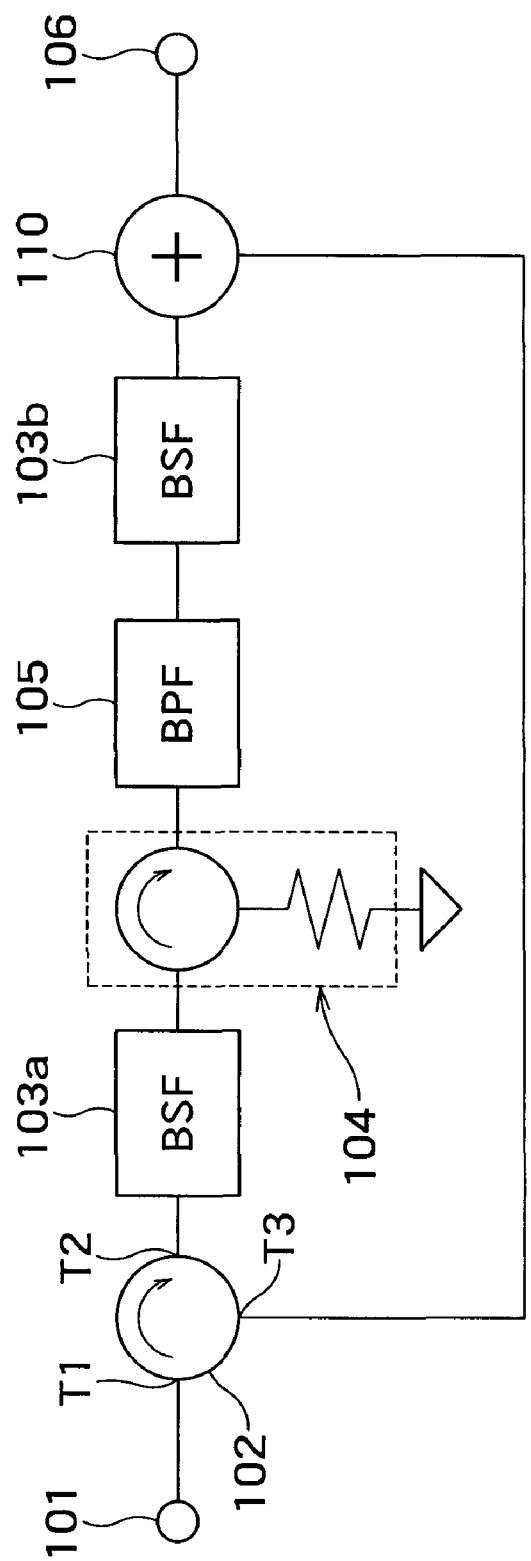
FIG. 1 is a circuit view showing a first example of a filter circuit of the present invention.

FIG. 1 is a block diagram showing a first example of a filter circuit according to the present invention.

In this filter circuit, a circulator 102, a band stop filter (BSF) 103a, an isolator 104, a band pass filter (BPF) 105, a band stop filter 103b and a synthesis circuit 110 are connected in cascade between an input terminal 101 and an output terminal 106. The circulator 102 has terminals T1, T2 and T3. The terminal T1 is connected to the input terminal 101, and the terminal T2 is connected to an input of the band stop filter 103a. An input of the synthesis circuit 110 is connected with the terminal T3 of the circulator 102 and an output of the band stop filter 103b. An output of the synthesis circuit 110 is connected to the output terminal 106.

The circulator 102 outputs signals, inputted from the input terminal 101 into the terminal T1, from the terminal T2 and transmits the signals to the band stop filter (BSF) 103a. Further, the circulator 102 receives at the terminal T2 signals reflected on the band stop filter 103a, and outputs the signals from the terminal T3 to transmit it to the synthesis circuit 110. Moreover, the circulator 102 outputs signals, received at the terminal T3, from the terminal 1 to transmit it to the input terminal 101.

The band stop filter (BSF) 103a has a power handling capability "Wbsf" (W), and frequencies "fbsf1" and "fbsf2" (fbsf1<fbsf2) of two points that determine a 3 dB band width of a return loss characteristic as a stop band. The stop band of the band stop filter 103a includes the center frequency of the present filter circuit. Further, the stop band of the band stop filter 103a includes the center frequency of the signals inputted into the input terminal 101. The band stop filter 103a reflects signals within the stop band and passes signals in a band outside the stop band.

The isolator 104 transmits the signals having passed through the band stop filter 103a as it is to the band pass filter (BPF) 105. Further, the isolator 104 attenuates (absorbs) the signals (signals outside a pass band) reflected on the band pass filter 105 to prevent the signals from returning to the band stop filter 103a.

The band pass filter (BPF) 105 has a power handling capability "Wbpf" (W) and frequencies "fbpf1" and "fbpf2" (fbpf1<fbpf2) of two points that determine a 3 dB band width of a transmission characteristic as the pass band. The band pass filter 105 transits signals within the pass band and reflects signals outside the pass band.

Here, the relation between the power handling capability "Wbsf" of the band stop filter 103a and the power handling capability "Wbpf" of the band pass filter 105 is: Wbsf>Wbpf. Namely, the power handling capability "Wbsf" of the band stop filter 103a is larger than the power handling capability "wbpf" of the band pass filter 105.

Further, the relation between the frequencies "fbsf1" and "fbsf2" (fbsf1<fbsf2) of two points that determine the 3 dB band width of the return loss characteristic of the band stop filter 103a and the frequencies "fbpf1" and "fbpf2" (fbpf1<fbpf2) of two points that determine the 3 dB band width of the transmission characteristic of the band pass filter 105 is: fbpf1<fbsf1<fbsf2<fbpf2. Namely, the relation between the pass band of the band pass filter and the stop band of the band stop filter is that the pass band includes the stop band.

The band stop filter 103b has the same stop band as that of the band stop filter 103a. The band stop filter 103b is arranged to prevent power from flowing from an antenna into the band pass filter 105 when power not released from the antenna returns according to the state of the antenna in the case of giving consideration to actual radio apparatus. Namely, the band stop filter 103b reflects large power signals in the stop band of the band stop filter 103b included in signals returned from the antenna by reflection, to prevent the large signals from being inputted into and destroying the band pass filter 105.

The synthesis circuit 110 synthesizes the signals reflected on the band stop filter 103a and inputted through the terminal T3 of the circulator 102 (signals in the stop band of the band stop filter 103a) and signals outputted from the band pass filter 105 and passes through the band stop filter 103b (signals in the pass band of the band pass filter 105) to obtain synthesis signals, and outputs the obtained synthesis signals from the output terminal 106. Namely, signals inputted from the input terminal 101 and having passed through the band stop filter 103a, the band pass filter 105 and the band stop filter 103b and signals reflected on the band stop filter 103a and taken out from the circulator 102 are synthesized in the synthesis circuit 110 and then outputted from the output terminal 106.

With the above configuration, it is possible to configure a filter circuit having a steep skirt characteristic without impairing power handling capability even with use of the band pass filter 105 having a smaller power handling capability than that of the band stop filter 103a. This is effective for example in the case of configuring the band pass filter of a superconductor having a limitation on a value of current per unit area which can flow in a superconducting state. There has been a problem with the prior art filter configuration in that large power cannot be passed (filtered) since a current value exceeds a critical current value. However, in the present example, signals in the stop band of the band stop filter 103a out of signals having large power densities within the stop band are reflected on the band stop filter, and only signals having small signals power outside the stop band are passed through a superconducting filter (band pass filter). The signals having passed through the superconducting filter and the signals in the stop band are then synthesized. In this manner, a filter circuit having large power handling capability and a steep skirt characteristic can be realized.

Figure 2:
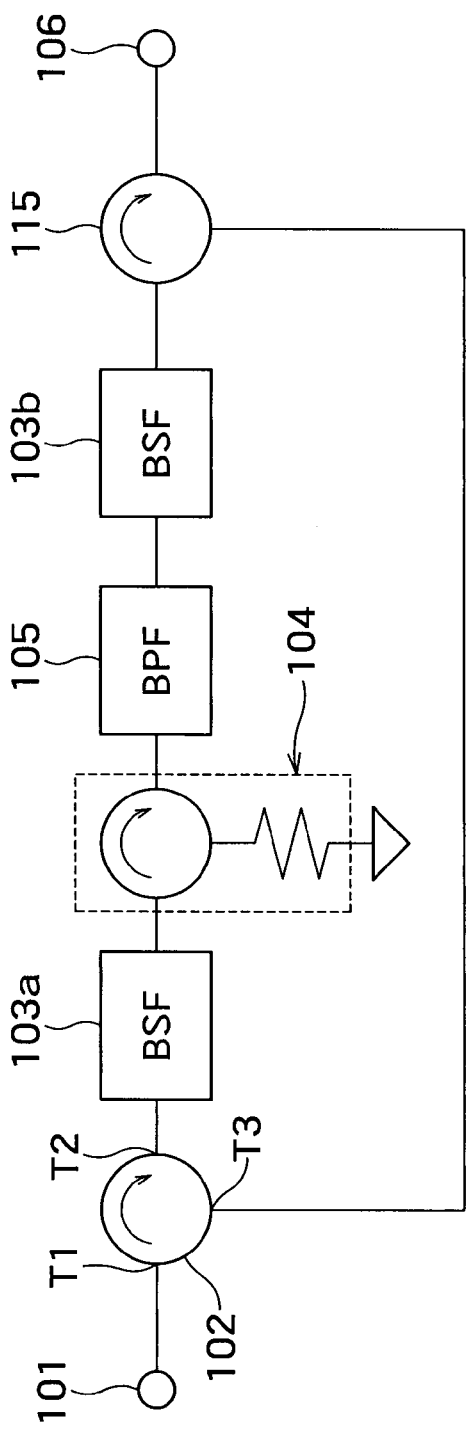
FIG. 2 is a circuit view showing a modified example of a filter circuit of FIG. 1.

FIG. 2 shows an example of a case where a circulator 115 is used as the synthesis circuit 110 of FIG. 1. Signals inputted from the circulator 102 into the circulator 115 are transmitted to the band stop filter 103b side and reflected on the band stop filter 103b. The reflected signals are outputted from the output terminal 106 together with output signals of the band pass filter 105. Reflected power from the antenna is transmitted to the terminal T3 of the circulator 102 by the circulator 115, and then transmitted from the terminal T1 of the circulator 102 to the input terminal 101. Therefore, the band pass filter 105 is not destroyed due to transmission of the reflected power from the antenna through the band pass filter 105 having low power handling capability.

Figure 3:
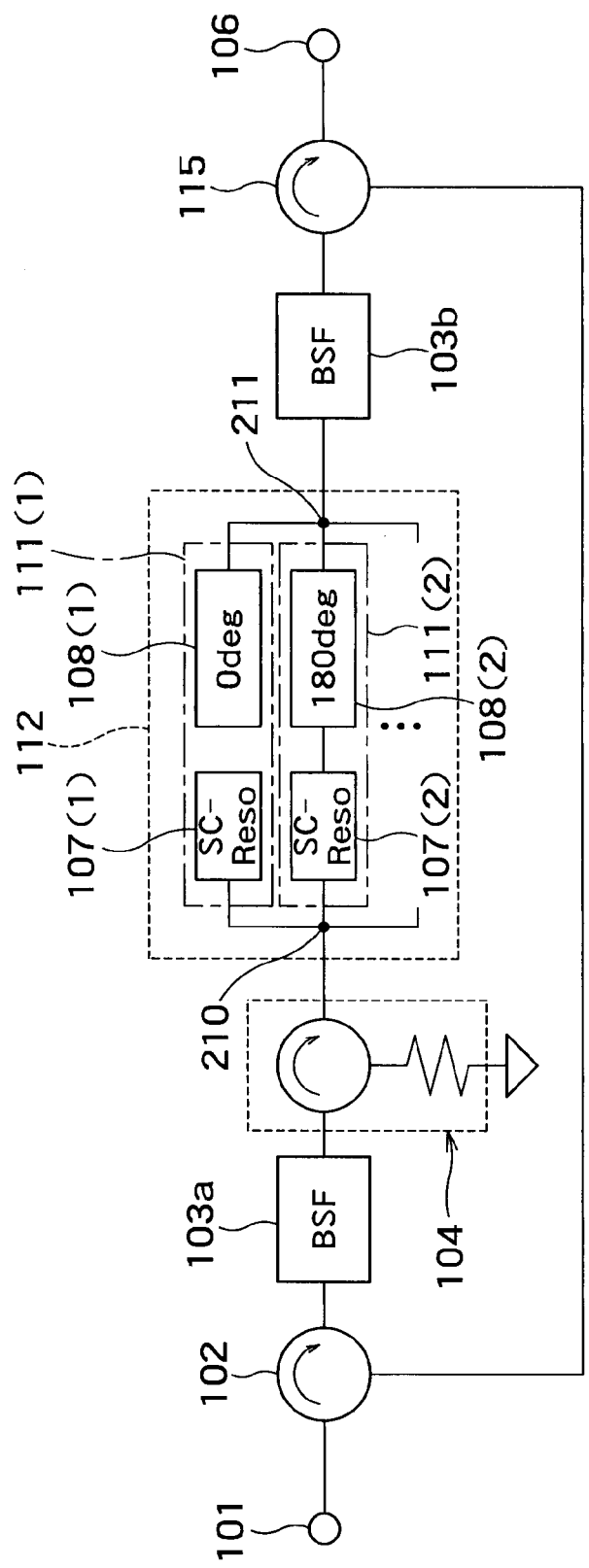
FIG. 3 is a circuit view showing a second example of the filter circuit of the present invention.

FIG. 3 is a block diagram showing a second example of the filter circuit according to the present invention.

In the filter circuit of FIG. 3, a resonator group circuit 112 is arranged in place of the band pass filter 105 in FIG. 2.

Figure 5A:
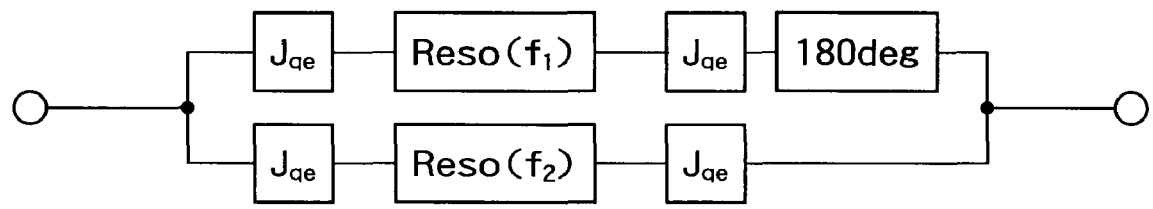
FIGS. 5A and 5B are views for explaining a sum synthesis.
Figure 5B:
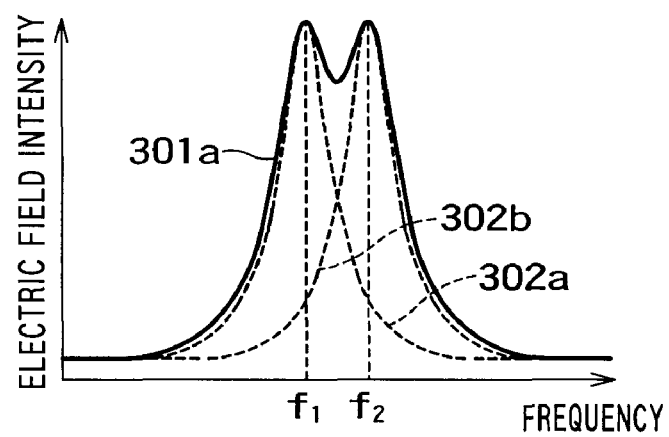
Figure 6A:
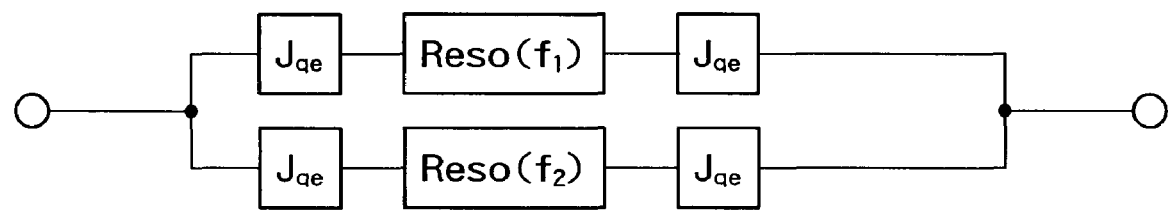
FIGS. 6A and 6B are views for explaining a difference synthesis.
Figure 6B:
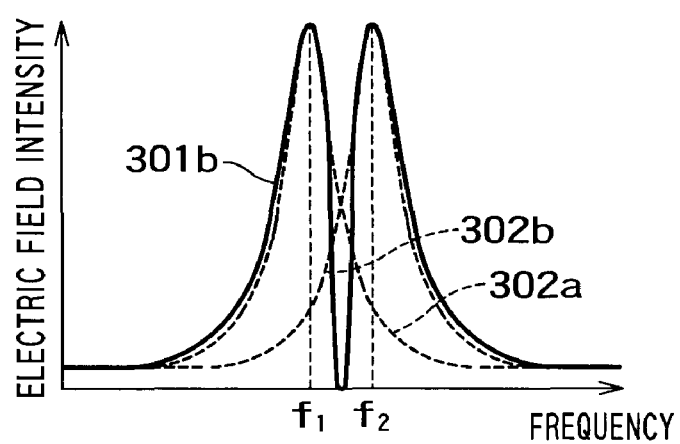

The resonator group circuit 112 has: a power distribution portion (power division portion) 210 for dividing signals having passed through the isolator 104; blocks 111(1), 111(2) . . . , connected in parallel with the power distribution portion 210 and each given signals divided by the power distribution portion 210; and a power synthesis portion 211 for synthesizing signals having passed through the blocks. Each block 111(N) (N=1, 2, . . . ) has: a resonator 107(N) consisting of the superconductor (SC) with a power handling capability not larger than a power handling capability "Wreso"(W); and a delay circuit (phase adjustment means) 108(N) connected in cascade with the resonator 107(N). A resonance frequency "freso⁻i" (i is not smaller than 1 and not larger than N) of each resonator 107(N) is different. At the time of power synthesis in the power synthesis portion 211, each delay circuit 108(N) makes adjacent signals having resonance frequencies satisfy a phase difference (reverse phase) condition in the range of 180+360×k±30(degrees) (k is an integer not smaller than 0) so as to obtain a sum synthesis of the adjacent signals having resonance frequencies. The sum synthesis is briefly described with reference to FIGS. 5 and 6. As in FIG. 5A, in a resonator parallel connection type, when signals having passed through two resonators with resonance frequencies "f1" and "f2" are synthesized with a delay difference of 180 degrees at the time of synthesis of those signals, obtained signals 301a are a sum synthesis of two signals (resonance waveforms) 302a and 302b as in FIG. 5B. Adjustment of an external circuit coupling coefficient "Jqe" allows configuration of the band pass filter. On the other hand, as in FIG. 6A, when the signals having passed through the two resonators with the resonance frequencies "f1" and "f2" are synthesized with a delay difference of 0 degree, obtained signals 301b are a difference synthesis of two signals (resonance waveforms) 302a and 302b as in FIG. 6B. Therefore, in the filter circuit of FIG. 3, a delay difference of 180 degrees is made between signals having passed through adjacent blocks so as to obtain a sum synthesis. Here, the numeric values (0 deg, 180 deg) of the delay circuit 108(N) are one example and another values can also be used. Further, the same characteristic can be obtained even when the sequence of the resonator 107(N) and the delay circuit 108(N) is changed in each block.

The relation between the power handling capability "Wbsf" of the band stop filter 103a and the power handling capability "Wreso" of the resonator 107(N) is: Wbsf>Wreso. Further, the relation between the frequencies "fbsf1" and "fbsf2" (fbsf1<fbsf2) of two points that determine the 3 dB band width of the return loss characteristic of the band stop filter 103a and the resonance frequency "freso⁻i" (i is not smaller than 1 and not larger than N) of each of the resonators is: freso⁻i<fbsf1 or fbsf2<freso⁻i. Namely, each of the resonators has a resonance frequency outside the stop band of the band stop filter 103a, and the resonator group circuit 112 uses such resonators, the power distribution portion 210 and the power synthesis portion 211 to extract signals in a desired band out of signals outside the stop band of the band stop filter 103a.

Figure 26:
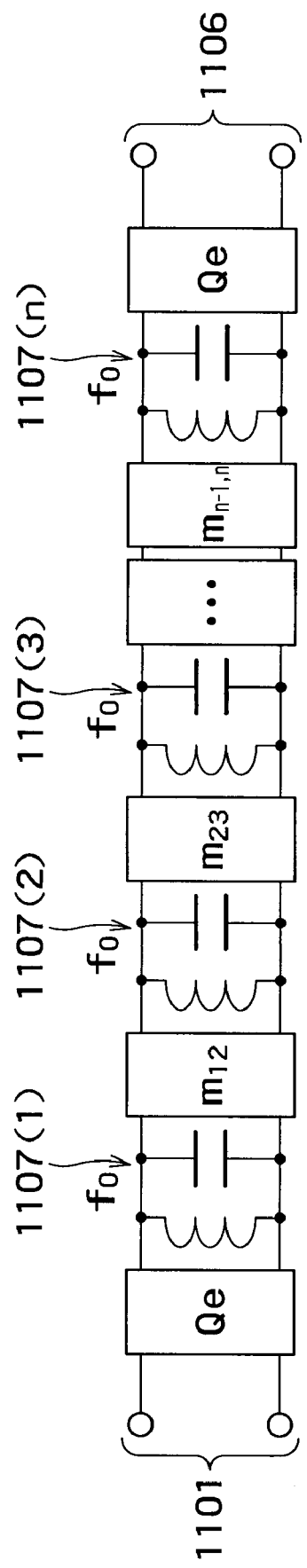
FIG. 26 is a circuit view showing a conventional filter circuit of cascade connection type.
Figure 27:
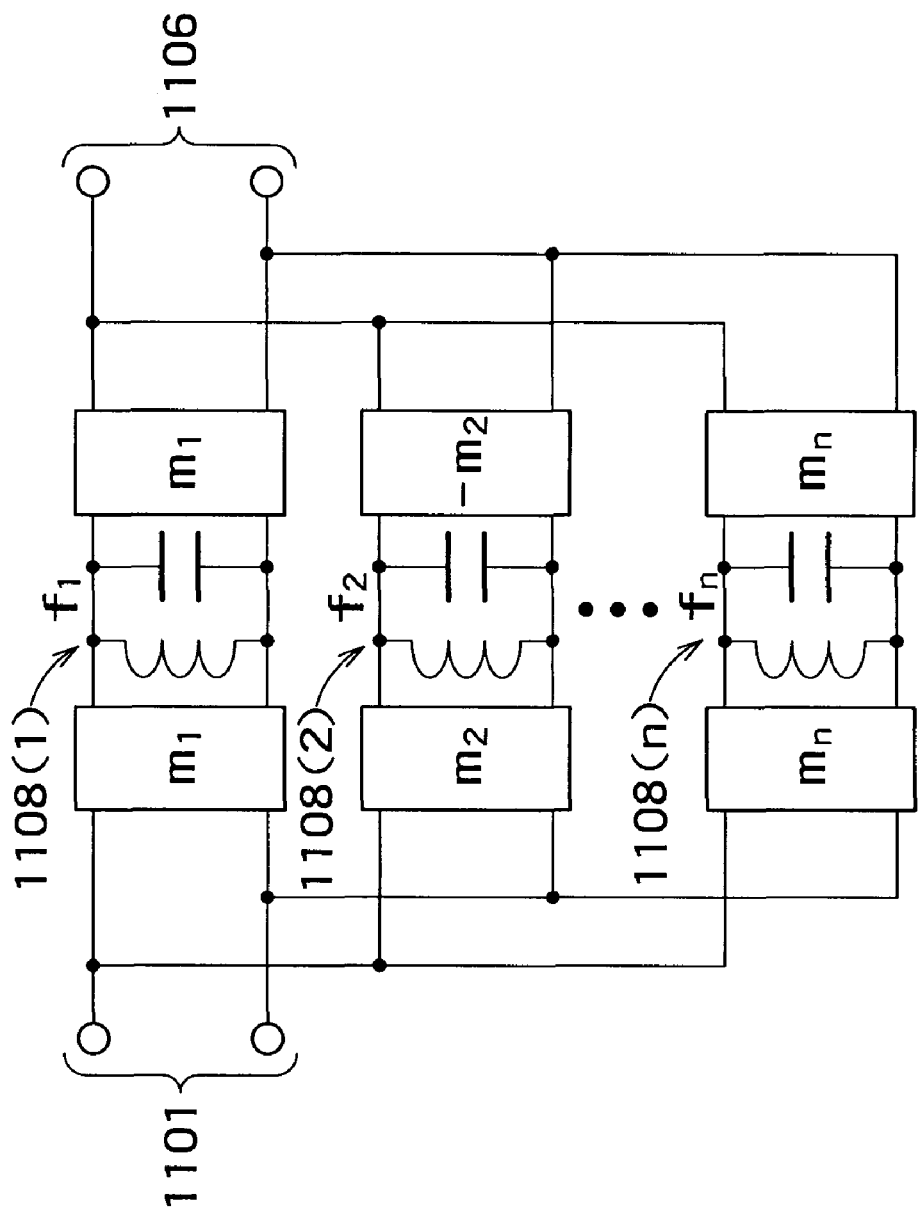
FIG. 27 is a circuit view showing a conventional filter circuit of parallel connection type.

With the above configuration, it is possible to configure a filter circuit having both a steep filter characteristic and power handling capability with the smaller number of resonators than that of the band pass filter 105 of FIG. 2. Namely, although the band pass filter 105 in FIG. 2 can be configured by cascade connection or parallel connection of resonators as shown in FIGS. 26 or 27, since there is no need for using a resonator having a resonance frequency within the stop band of the band stop filter 103a in FIG. 3, and the number of resonators can thereby be reduced.

Figure 4:
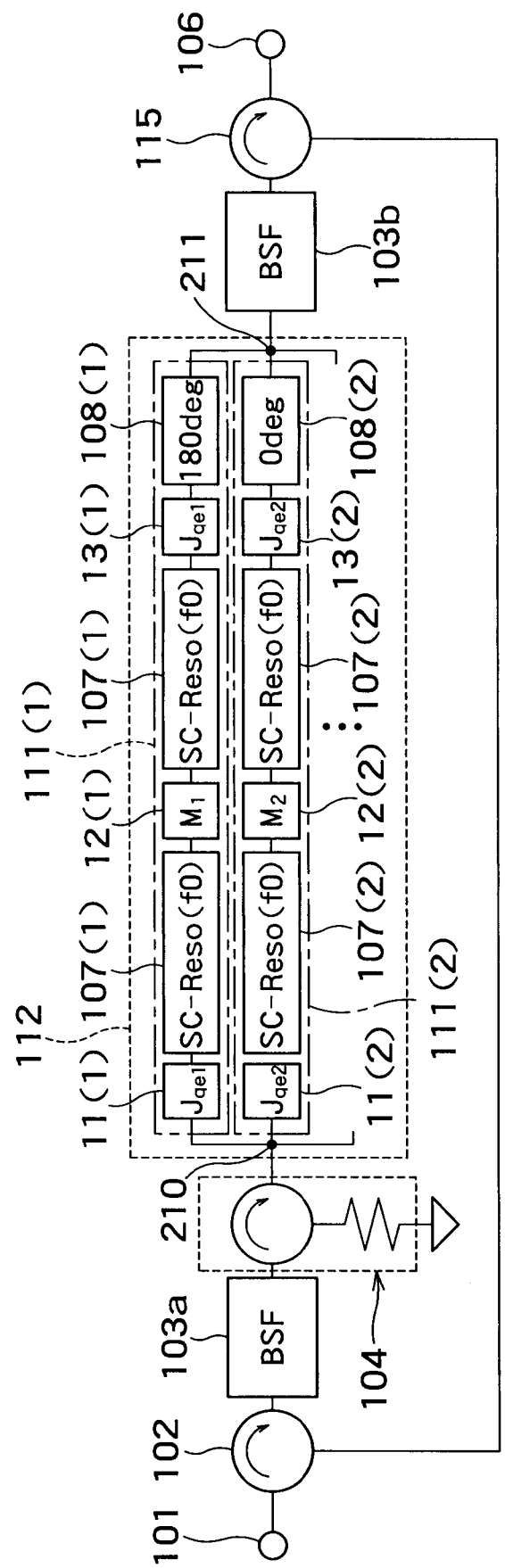
FIG. 4 is a circuit view showing a partially changed example of the filter circuit of FIG. 3.

FIG. 4 is a view where the configuration of the resonator group circuit 112 of the filter circuit of FIG. 3 is changed. In the block 111(N), the two resonators 107(N), sandwiched between three coupling circuits 11(N) to 13(N), and the delay circuit 108(N) are connected in cascade. The coupling circuit 12(N) is coupled with the two resonators 107(N) by an inter-resonator coupling coefficient "$M_j$" (j is from 1 to N), and each resonator 107(N) has the same resonance frequency as a center frequency "f0" of the filter circuit.

The relation of Mj is: $M_1<M_2<\ldots<M_N$. The coupling circuit 11(N) connects between the power distribution portion 210 and the resonator 107(N) by an external circuit coupling coefficient (external portion Q) "$J_{qej}$" (j is from 1 to N), and the coupling circuit 13(N) connects between another resonator 107(N) and the delay circuit 108(N) by the external circuit coupling coefficient "$J_{qej}$" (i is from 1 to N). The relation of "$j_{qej}$" is: $j_{qe1}>J_{qe2}>\ldots>J_{qeN}$ (when described by the external portion Q: Qe1<Qe2<...<QeN). The delay circuit 108(N) makes signals whose degeneration has been eliminated by coupling between the two resonators 107(N) satisfy a phase difference (reverse phase) condition in the range of 180+360× k±30(degrees) (k is an integer not smaller than 0) between the adjacent blocks (between blocks with Ms adjacent to each other) so as to obtain a sum synthesis of the signals between the adjacent blocks. The filter can be configured in the same manner even when the sequence of blocks in the resonator groups is changed. Further, the filter can be configured in the same manner even when the respective sequences of blocks in the two resonator groups are different from each other.

In this filter circuit, the relation between the power handling capability "Wbsf" of the band stop filter 103a and the power handling capability "Wreso" of each of the resonators is: Wbsf>Wreso. Further, the relation among the difference "fbsf2−fbsf1" in frequency of two points that determine the 3 dB band width of the return loss characteristic of the band stop filter 103a, the inter-resonator coupling coefficient "Mj" and the center frequency "f0" is: Fbsf2−fbsf1<Mj×f0. It should be noted that the number of resonators included in the band stop filters 103a and 103b is an even number (c.f. later-described FIG. 20).

Figure 7:
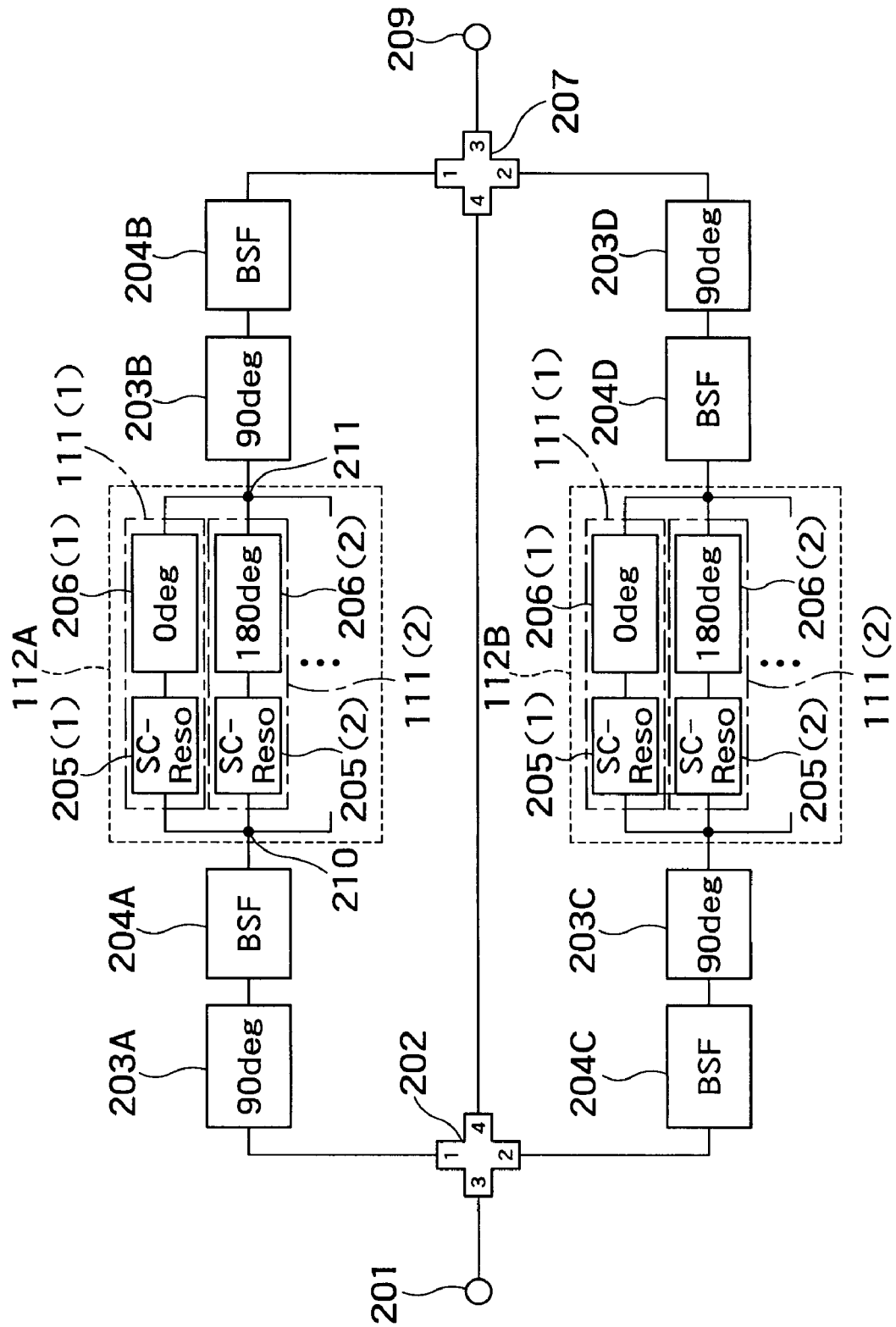
FIG. 7 is a circuit view showing a third example of the filter circuit of the present invention.

FIG. 7 is a view showing a third example of the filter circuit according to the present invention.

FIG. 3 shows a filter circuit as an example of the filter circuit in the case of using a four-port element in place of a circulator. The respective terminals of the four-port element having an S-parameter which is defined in the following expression are defined as terminals 1 to 4.

$$[S] = \frac{1}{\sqrt{2}}\begin{bmatrix} 0 & 0 & 1 & 1 \\ 0 & 0 & -1 & 1 \\ 1 & -1 & 0 & 0 \\ 1 & 1 & 0 & 0 \end{bmatrix} \quad \text{[Formula 1]}$$

Figure 8:
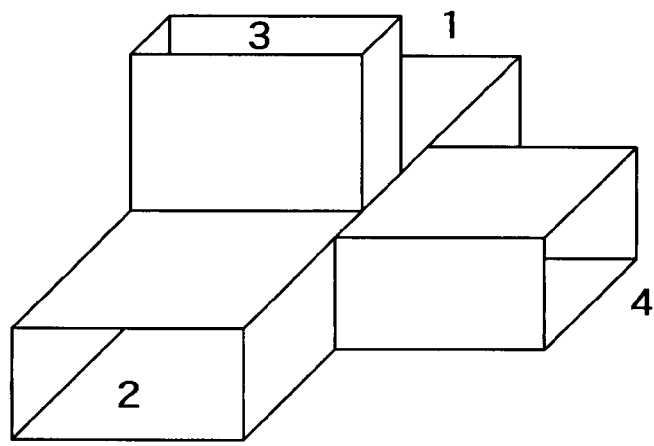
FIG. 8 is an image view of a four-port element using waveguide tubes.
Figure 9:
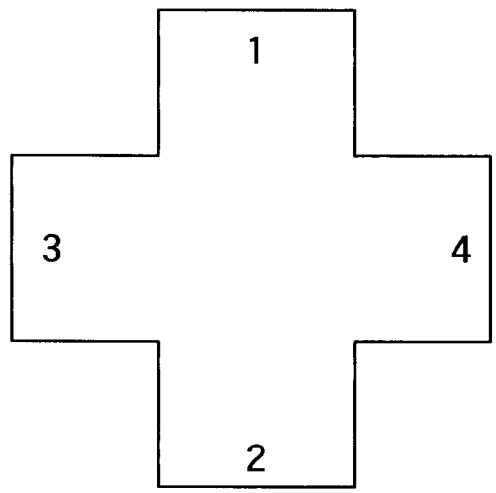
FIG. 9 is a view showing terminal numbers of the four-port element.
Figure 10:
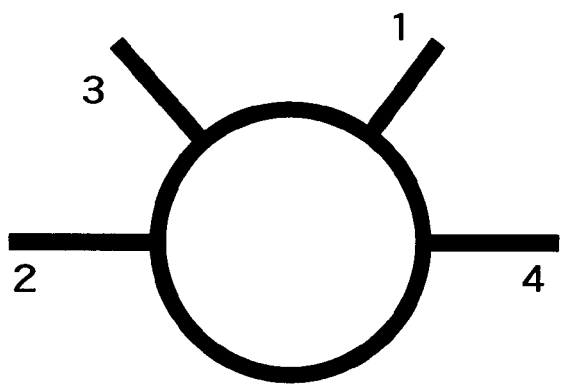
FIG. 10 is an image view of the four-port element using microstrip lines.

Examples of the four-port element include a magic T using waveguide tubes shown in FIG. 8. The corresponding relations between the numbers put down on the magic T and the terminals of each of the four-port elements 202 and 207 of FIG. 7 are shown in FIG. 9. Further, examples of the four-port element using transmission lines (for example, micro-strip lines) include a ratrace circuit as shown in FIG. 10. The four-port element typically has a low-loss characteristic as compared with the circulator, and hence a method of using the four-port element is effective for reducing a loss of transmission through the filter circuit. In the example of FIG. 7, the terminal 3 of the four-port element 202 corresponds to the terminal A, the terminal 1 to the terminal B, the terminal 2 to the terminal C, and the terminal 4 to the terminal D. The terminal 4 of the four-port element 207 corresponds to the terminal E, the terminal 1 to the terminal F, the terminal 2 to the terminal G, and the terminal 3 to the terminal H.

An input terminal 201 is connected to the terminal 3 of the four-port element 202, the terminal 4 of the four-port element 202 is connected with the terminal 4 of the four-port element 207, and the terminal 3 of the four-port element 207 is connected with an output terminal 209. Between the terminal 1 of the four-port element 202 and the terminal 1 of the four-port element 207, a delay circuit 203A, a band stop filter 204A, a resonator group circuit 112A, a delay circuit 203B and a band stop filter 204B are connected in cascade. Between the terminal 2 of the four-port element 202 and the terminal 2 of the four-port element 207, a band stop filter 204C, a delay circuit 203C, a resonator group circuit 112B, a band stop filter 204D and a delay circuit 203D are connected in cascade. The resonator group circuits 112A and 112B have the same configuration, and in each of the circuits, blocks having single resonators with different frequencies are connected in parallel. The four band stop filters 204A to 204D have the same stop band.

In the delay circuit 203A, the difference (phase difference) between the length of electricity from the terminal 1 of the four-port element 202 to the band stop filter 204A and the length of electricity from the terminal 2 of the four-port element 202 to the band stop filter 204C is 90 degrees. The delay circuit 203A makes a phase of signals, which was sent from the terminal 1 and reflected on the band stop filter 204A to be returned to the terminal 1 of the four-port element 202, reverse to a phase of signals sent from the terminal 1. Further, the delay circuit 203A makes a phase of signals, which passed through the band stop filter 204A and was reflected on the resonator group circuit 112A to be returned to the terminal 1, reverse to the phase of the signals sent from the terminal 1.

In the delay circuit 203D, the difference (phase difference) between the length of electricity from the terminal 1 of the four-port element 207 to the band stop filter 204B and the length of electricity from the terminal 2 of the four-port element 207 to the band stop filter 204D is 90 degrees. The delay circuit 203D makes a phase of signals, which was sent from the terminal 2 and reflected on the band stop filter 204D to be returned to the terminal 2 of the four-port element 207, reverse to a phase of signals sent from the terminal 2. Further, the delay circuit 203D makes a phase of signals, which was sent from the terminal 2, passed through the band stop filter 204D and was reflected on the resonator group circuit 112B to be returned to the terminal 2, reverse to the phase of the signals sent from the terminal 2.

In the delay circuit 203C, the difference (phase difference) between the length of electricity from the terminals 1 and 2 of the four-port element 202 to the resonator group circuits 112A and 112B is 0 degree. The delay circuit 203C makes a phase of signals, which was sent from the terminal 2, passed through the band stop filter 204C and was reflected on the resonator group circuit 112B to be returned to the terminal 2 of the four-port element 202, reverse to a phase of the signals sent from the terminal 2.

In the delay circuit 203B, the difference (phase difference) between the length of electricity from the terminals 1 and 2 of the four-port element 207 to the resonator group circuits 112A and 112B is 0 degree. The delay circuit 203B is arranged for compensating a phase delay due to arrangement of the delay circuit 203C, and has the same phase delay amount as that of the delay circuit 203C.

Figure 11:
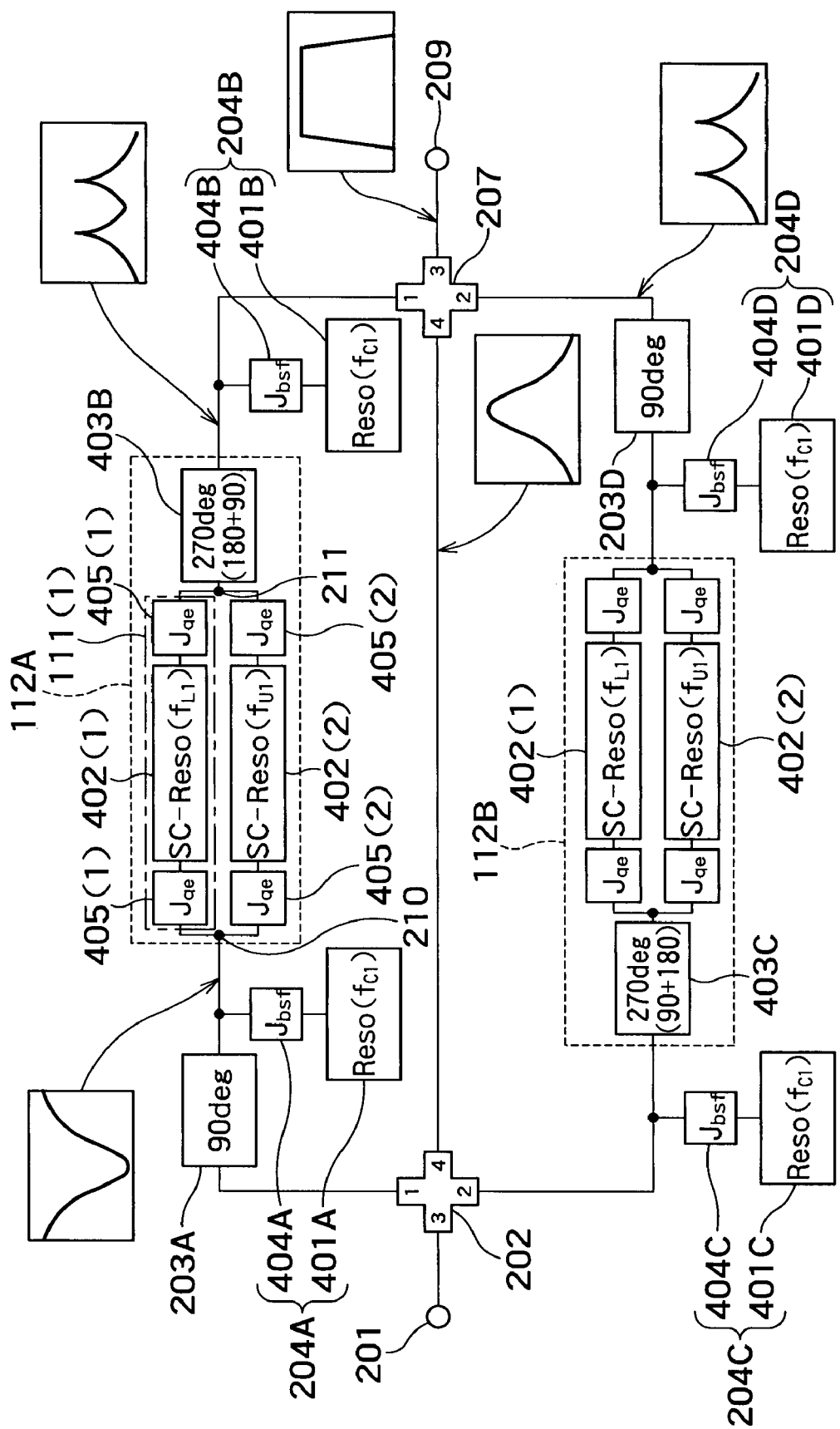
FIG. 11 is a circuit view showing the filter circuit of FIG. 7 in specific form.

FIG. 11 shows a specific example of the filter circuit of FIG. 7. Two resonators 402(1) and 402(2) in the resonators circuits 112A and 112B and a delay circuit (transmission line) 403 are formed by superconduction. The resonance frequencies "$f_{L1}$" and "$f_{U1}$" ($f_{L1} < f_{U1}$) of the resonators 402(1) and 402(2) sandwich the stop bands of the band stop filters (401, 404) and are positioned respectively on both sides of the band stop filters (namely, "$f_{L1}$" and "$f_{U1}$" are not adjacent to each other.) The waveforms shown in the figure are transmission spectrums in typical places shown by arrows in the case of inputting flat signals as input signals into the input terminal 201. The operation of this filter circuit is described below.

Power of signals inputted from the input terminal 201 is distributed into two in the four-port element 202, and outputted with reverse phases from the terminal 1 and the terminal 2. Out of the signals outputted from the terminal 1, signals in the vicinity of a center frequency "$f_{c1}$" (signals in the stop band) is reflected on the band stop filter 204A as a first step consisting of a resonator 401A and a coupling circuit 404A. Similarly, out of the signals outputted from the terminal 2, signals in the vicinity of the center frequency "$f_{c1}$" (signals in the stop band) are reflected on the band stop filter 204C as a first step consisting of a resonator 401C and a coupling circuit 404C. The signals reflected on the band stop filters 204A and 204C are made to have the relation of the same phase by the delay circuit 203A, and returned to the terminal 1 and the terminal 2 of the four-port element 202A. The power of these signals is synthesized and the synthesized signals are outputted from the terminal 4.

The signals outputted from the terminal 4 of the four-port element 202A is inputted into the terminal 4 of the four-port element 207, and the inputted signals are distributed into two and outputted from the terminal 1 and the terminal 2 in the same phase relation. Out of the signals outputted from the terminal 1, signals in the vicinity of the center frequency "$f_{c1}$" (signals in the stop band) are reflected on the band stop filter 204B as a first step consisting of a resonator 401B and a coupling circuit 404B. Similarly, also out of the signals outputted from the terminal 2, signals in the vicinity of the center frequency "$f_{c1}$" (signals in the stop band) are reflected on the band stop filter 204D as a first step consisting of a resonator 401D and a coupling circuit 404D. The signals reflected on the band stop filters 204B and 204D are made to have the relation of the reverse phase by the delay circuit 203D, and returned to the terminal 1 and the terminal 2 of the four-port element 207. In the four-port element 207, the signals in the stop band inputted into the terminal 1 and the terminal 2 are synthesized and then outputted from the terminal 3.

Meanwhile, signals in a frequency band having passed through the band stop filter 204A (signals outside the stop band) are inputted into the resonator group circuit 112A. In the resonator group circuit 112A, signals with resonance waveforms by the resonators 402(1) and 402(2) are extracted, and a synthetic wave signals (signals in a desired band) obtained by synthesizing the extracted signals with resonance waveforms passes. The signals in the frequency band (signals outside the stop band) having passed through the band stop filter 204C are inputted into the resonator group circuit 112B through a delay circuit 403C. In the resonator group circuit 112B, signals with resonance waveforms by the resonators 402(1) and 402(2) are extracted, and synthetic wave signals (signals in a desired band) obtained by synthesizing the extracted signals with resonance waveforms passes. The signals having passed through the resonator group circuit 112A pass through the delay circuit 403B, then are inputted into the terminal 1 and the terminal 2 of the four-port element 207 with the inverse phase as that of the signals having passed through the resonator group circuit 112B. The four-port element 207 synthesizes the signals in a desired band which were inputted into the terminal 1 and the terminal 2, and outputs the synthesized signals from the terminal 3.

Signals (reflected signals) that do not pass the resonator group circuits 112A and 112B are returned to the terminal 1 and the terminal 2 of the four-port element 202A in the reverse-phase relation by the delay circuits 203A and 403C. The power of those signals is synthesized and the synthesized signals are returned to the input terminal 201 from the terminal 3.

As thus described, since large power in the vicinity of the center frequency "$f_{c1}$" of the filter circuit does not pass through the superconducting resonator group circuits 112A and 112B, it is possible to realize both a steep filter characteristic using a superconductor and a filter characteristic having great power handling capability.

Figure 12A:
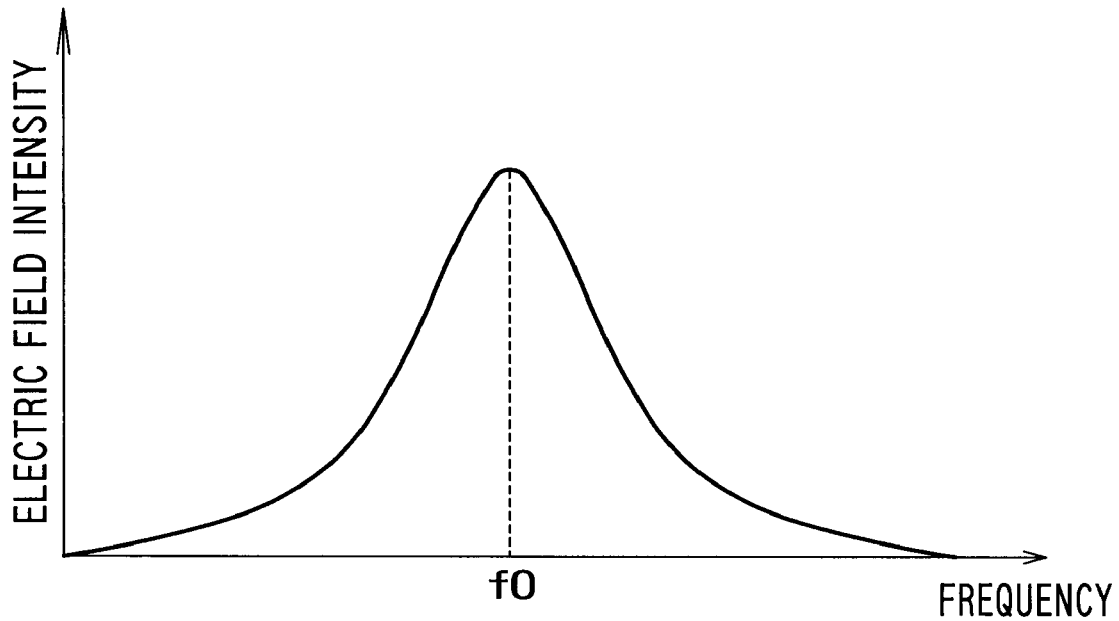
FIGS. 12A and 12B are views showing a frequency spectrum of input signals and a frequency response of the filter circuit of FIG. 11.
Figure 12B:
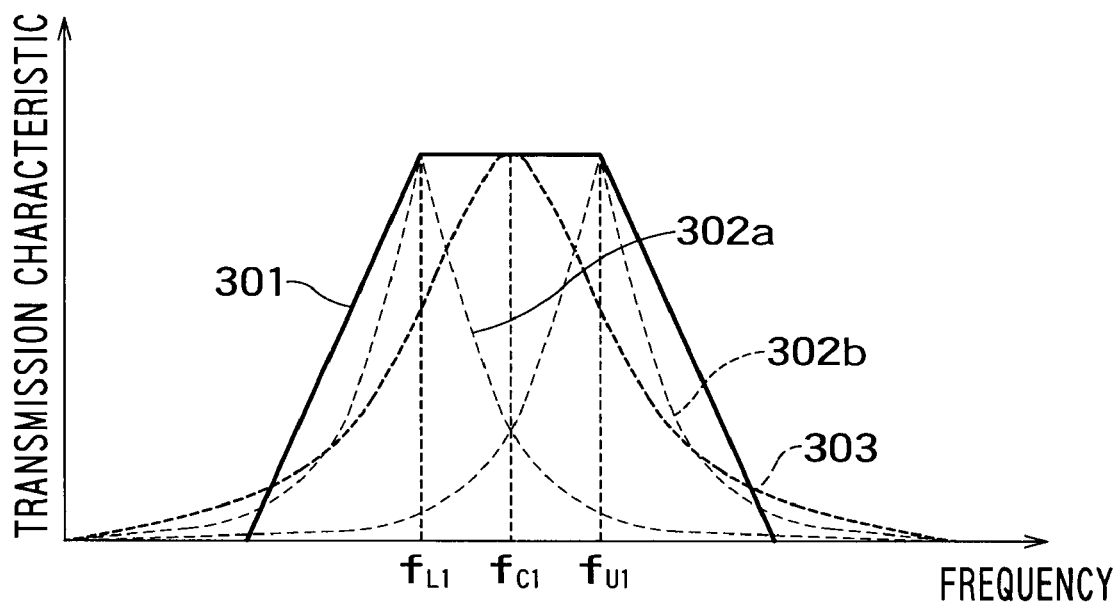

As one example, FIG. 12B shows a frequency response in the case of inputting signals having a spectrum of FIG. 12A as input signals into the filter circuit of FIG. 11.

Figure 13:
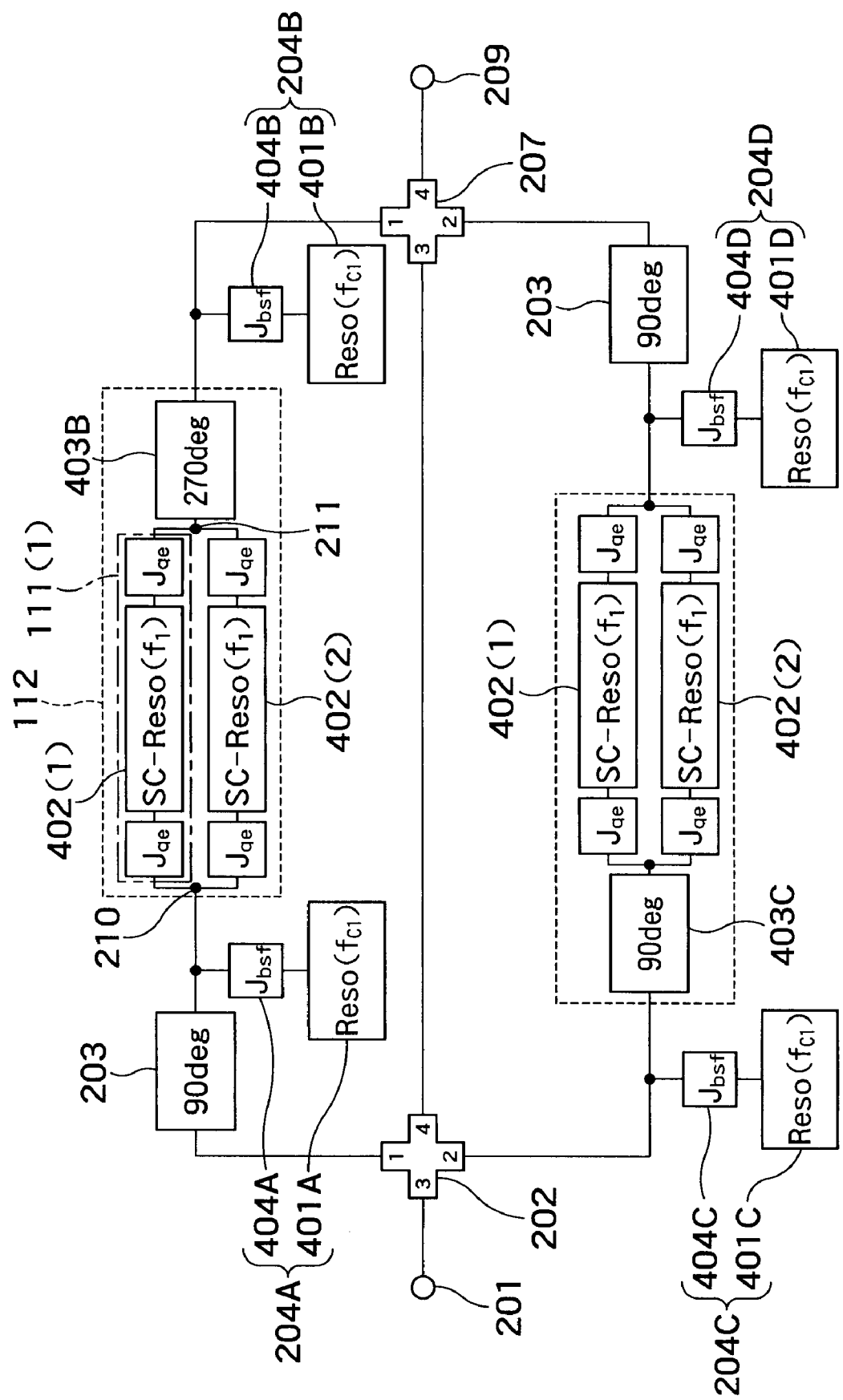
FIG. 13 is a view showing an example where connection destinations of a terminal 3 and a terminal 4 of the four-port element in a post-stage are reversed.

FIG. 13 shows an example of the case where the connection destinations of the terminal 3 and the terminal 4 of the four-port element 207 are reversed. Namely, the terminal 3 is connected to the terminal 4 of the four-port element 202, and the terminal 4 is connected to the output terminal 209. Thereby, a delay amount of the delay circuit 403C can be reduced from the 270 degrees of FIG. 11 to 90 degrees (a 180-degree delay phase circuit can be omitted), to scale down the circuit configuration. Namely, in order to make the input signals into the terminal 1 and the terminal 2 of the four-port element 207 have the same phase, the delay amount of the delay circuit 403C of FIG. 11 can be reduced by 180 degrees. Although the example was shown in FIG. 13 where the connection destinations of the terminal 3 and the terminal 4 of the four-port element 207 were reversed, the connection destinations of the terminal 3 and the terminal 4 of the four-port element 202 may be reversed, or the connection destination of the terminal 3 and the terminal 4 of both the four-port elements 202 and 207 may be reversed.

Figure 14:
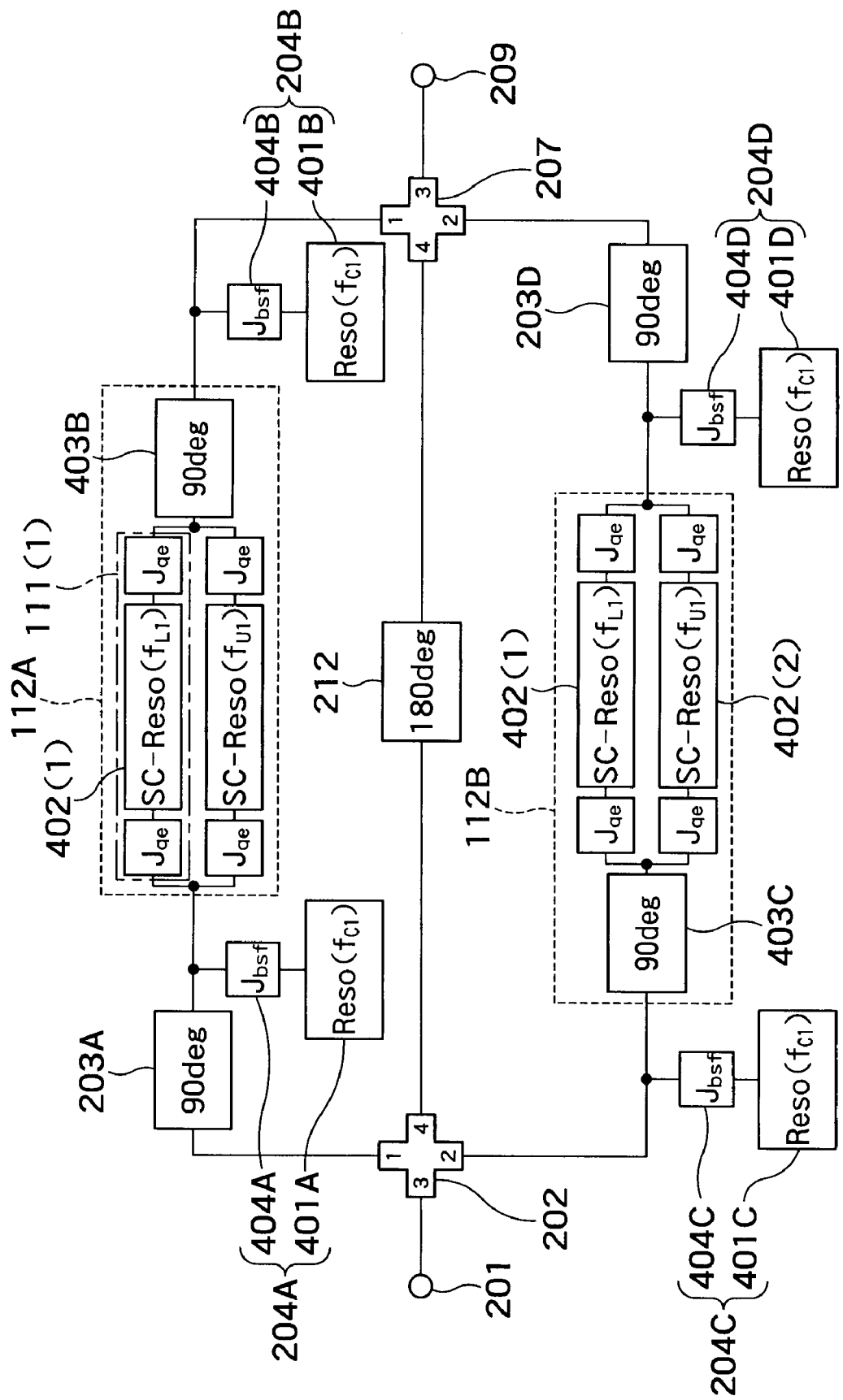
FIG. 14 is a view showing an example where a delay circuit is inserted between two four-port elements.

FIG. 14 shows an example where a 180-degree delay circuit 212 is added to a line connecting between the four-port element 202 and the four-port element 207. Since such addition can lead to reduction in delay amount of each of the delay circuits 403B and 403C included in the resonator group circuits 112A and 112B of FIG. 11 from 270 degrees to 90 degrees, the line length of the whole filter circuit can be shorter to reduce the circuit scale.

Figure 15:
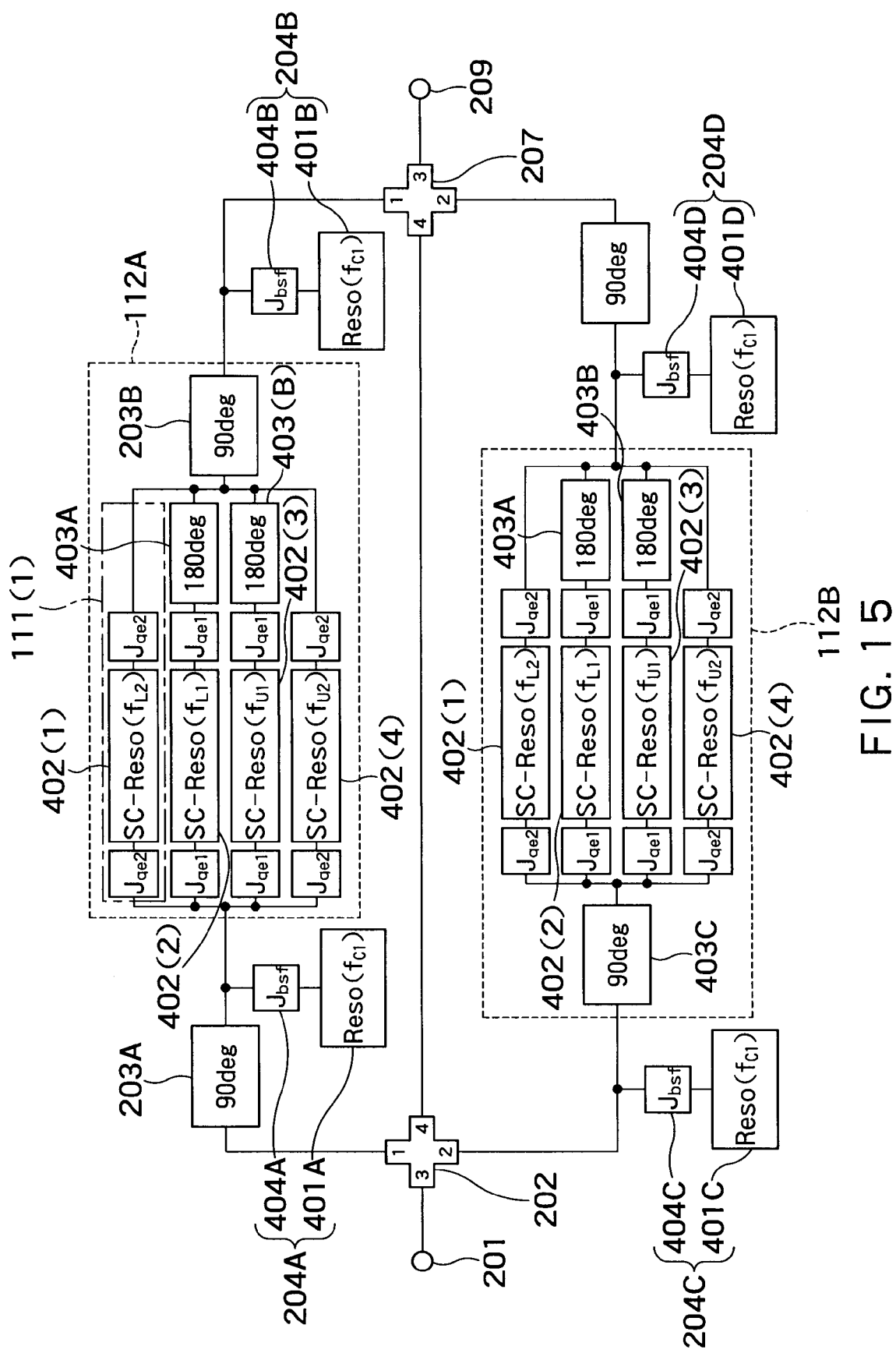
FIG. 15 is a view showing an example where a resonator group circuit is configured by parallel connection of four resonators.
Figure 16:
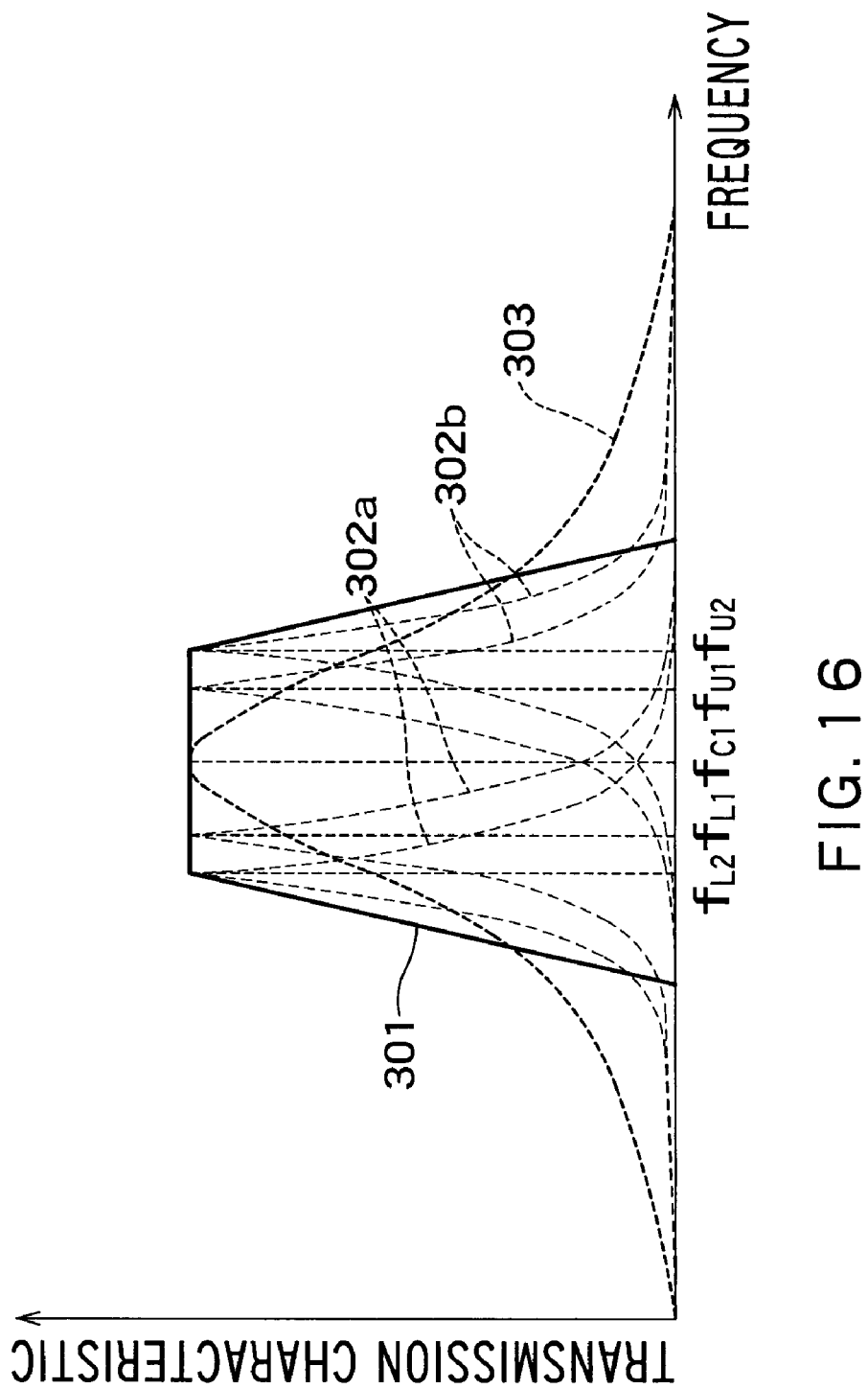
FIG. 16 is a view showing a frequency response of the filter circuit of FIG. 15.

FIG. 15 shows an example of a case where resonators 402(1) to 402(4) formed of the superconductor are arranged in parallel within the resonator group circuits 112A and 112B. The resonance frequencies "$f_{L2}$" and "$f_{L1}$" ($f_{L2}<f_{L1}$) of the resonators 402(1) and 402(2) are included in a low band side of a band outside the stop band of the band stop filter 204A. The signals having passed through the resonators 402(1) and 402(2) are made to have a phase difference of 180 degrees by the delay circuit 403A for obtaining a sum synthesis. The resonance frequencies "$f_{U1}$" and "$f_{U2}$" ($f_{U1}<f_{U2}$) of the resonators 402(3) and 402(4) are included in a high band side of the band outside the stop band of the band stop filter 204A. The signals having passed through the resonators 402(3) and 402(4) are made to have a phase difference of 180 degrees by the delay circuit 403B for obtaining a sum synthesis. FIG. 16 shows a frequency response of this filter circuit. As apparent by comparison with FIG. 12B showing the frequency response of the filter circuit of FIG. 11, it is possible to obtain a steeper output signals 301 by use of a large number of resonators.

Figure 17:
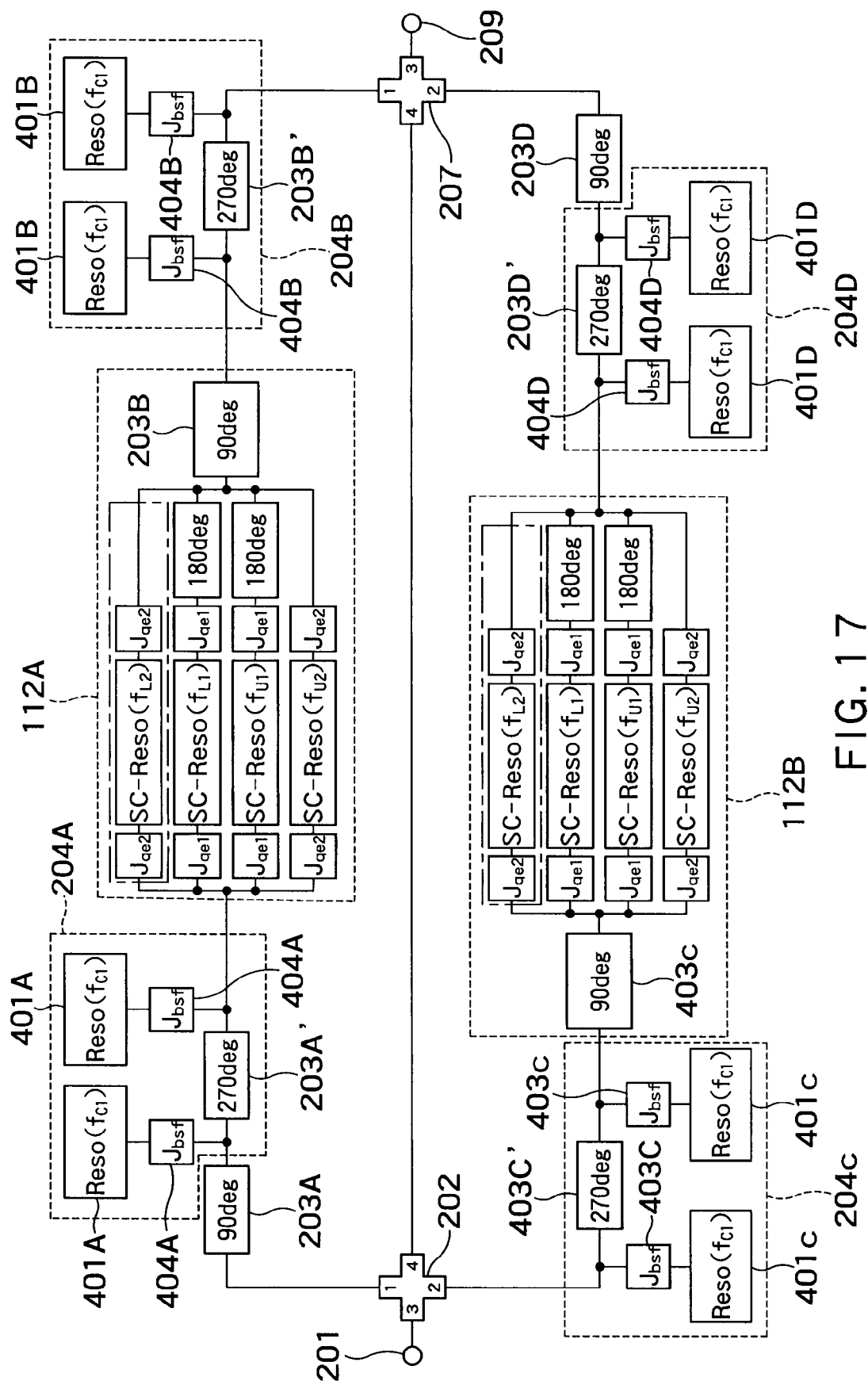
FIG. 17 is a view showing an example where a band pass filter is configured using two resonators.

FIG. 17 shows an example where a band stop filter is configured using two resonators in the filter circuit of FIG. 15. For example, the band stop filter 204A consists of two resonators 401A, two coupling circuits 404A and a delay circuit 203A'. In the same manner, the band stop filters 204B and 204C are configured.

Figure 18:
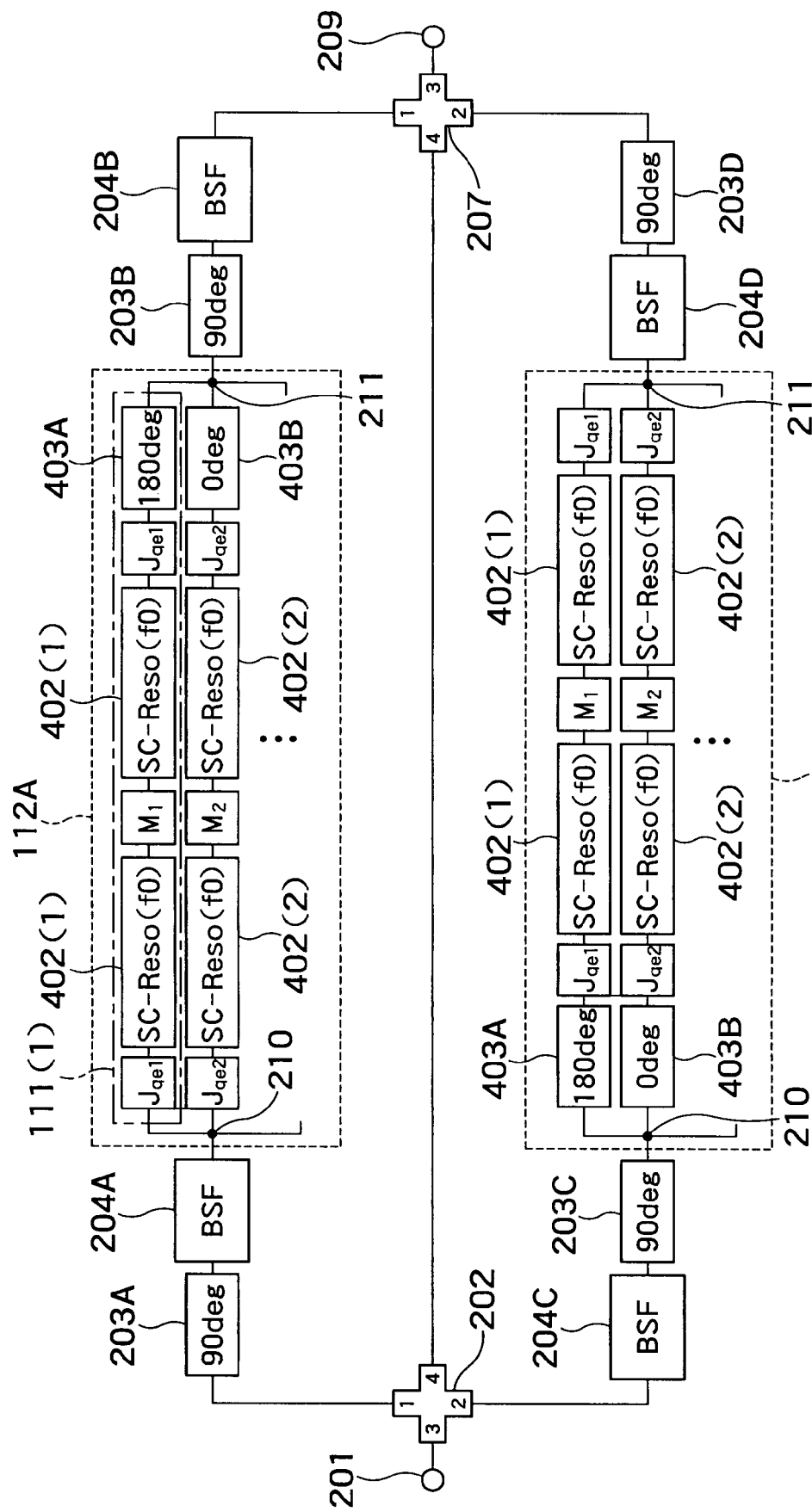
FIG. 18 is a circuit view showing a fourth example of a filter circuit of the present invention.

FIG. 18 shows a fourth example of the filter circuit according to the present invention.

Figure 19:
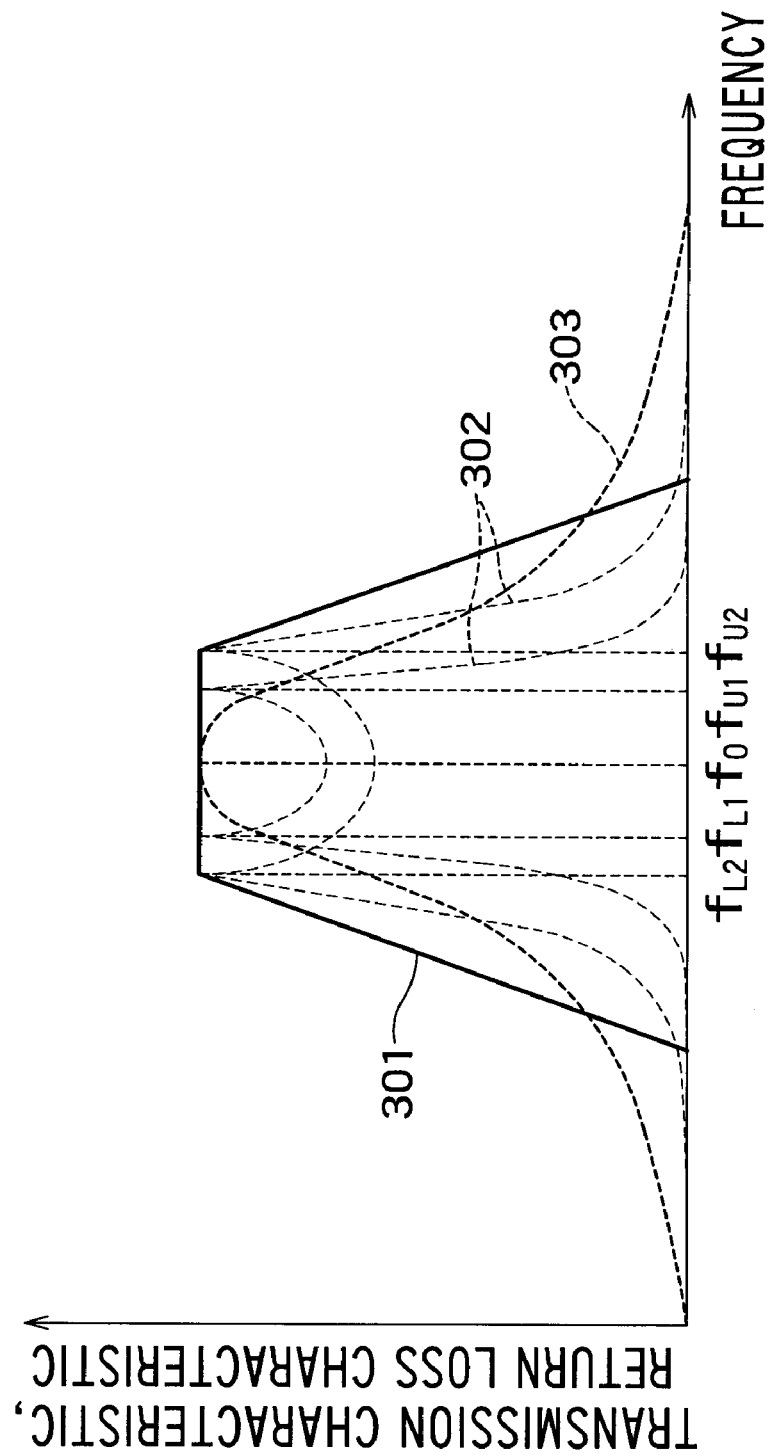
FIG. 19 is a view showing a frequency response of FIG. 18.
Figure 20:
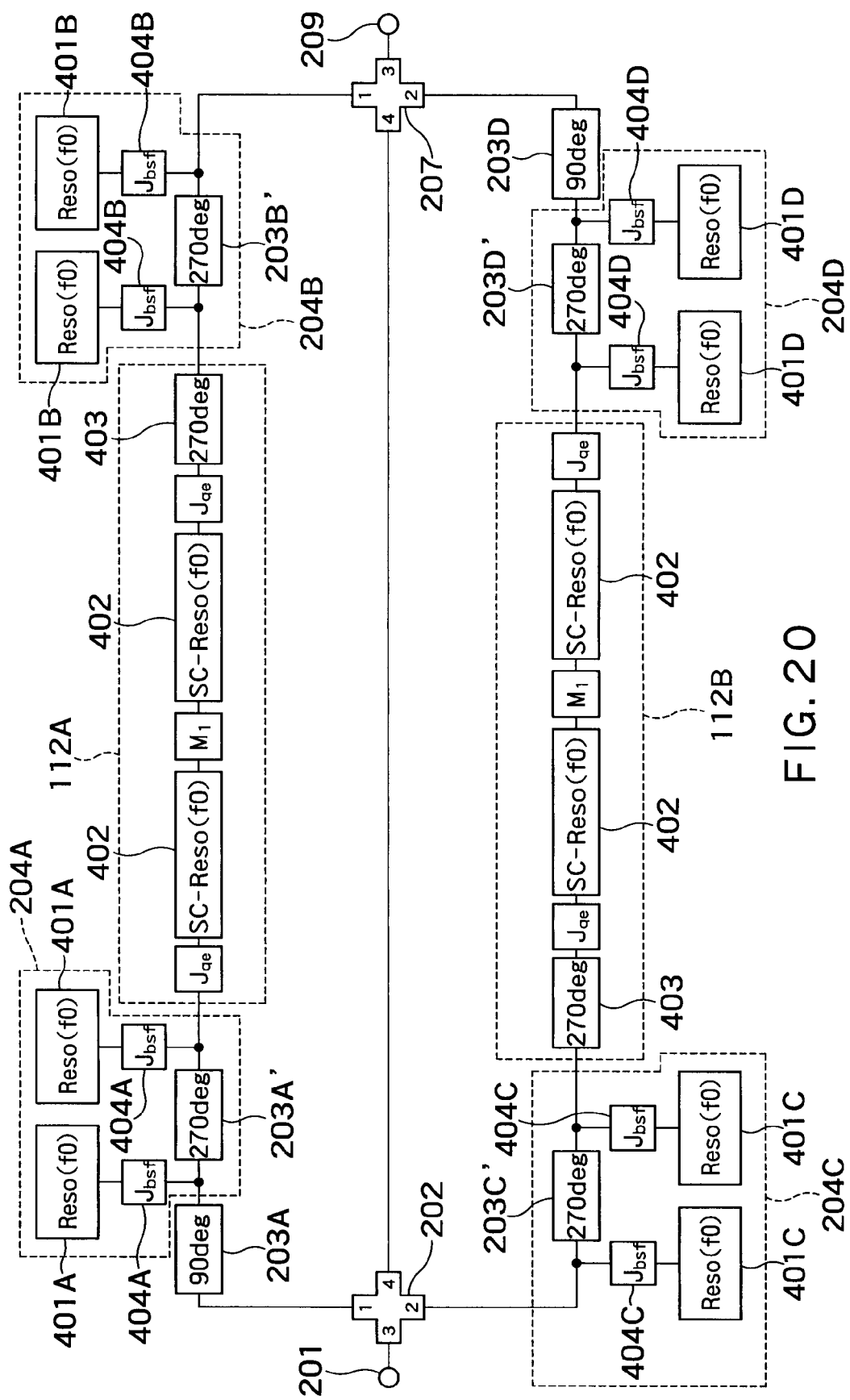
FIG. 20 is a view showing an example where a band pass filter is configured using two resonators.

This filter circuit is configured by replacing the resonator group circuits 112A and 112B of the filter circuit of FIG. 7 with the resonator group circuit 112 of FIG. 4. However, in the resonator group circuit 112B, the delay circuits 403A and 403B are placed not immediately before the power synthesis portion 211 but immediately after the power distribution portion 210. It should be noted that the number of resonators in the band stop filters 204A to 204D is an even number. FIG. 19 shows a frequency response of the filter circuit of FIG. 18. A filter characteristic 301 is realized by use of superposition of resonance waveforms 302 whose degeneracy have been eliminated. Further, the larger the inter-resonator coupling coefficient "Mj" becomes, the larger the difference in frequency (peak width of the resonance waveforms 302) whose degeneracy have been eliminated becomes. Here, there is a relation: $M_1=(f_{U1}-f_{L1})/f_0$, $M_2=(f_{U2}-f_{L2})/f_0$. FIG. 20 shows an example of a filter circuit in a case where the band stop filter is configured using two resonators and the number of blocks including cascade connection of superconducting resonators in the resonator group circuits 112A and 112B is one. As thus described, the number of blocks including cascade connection of superconducting resonators may be only one.

Figure 21:
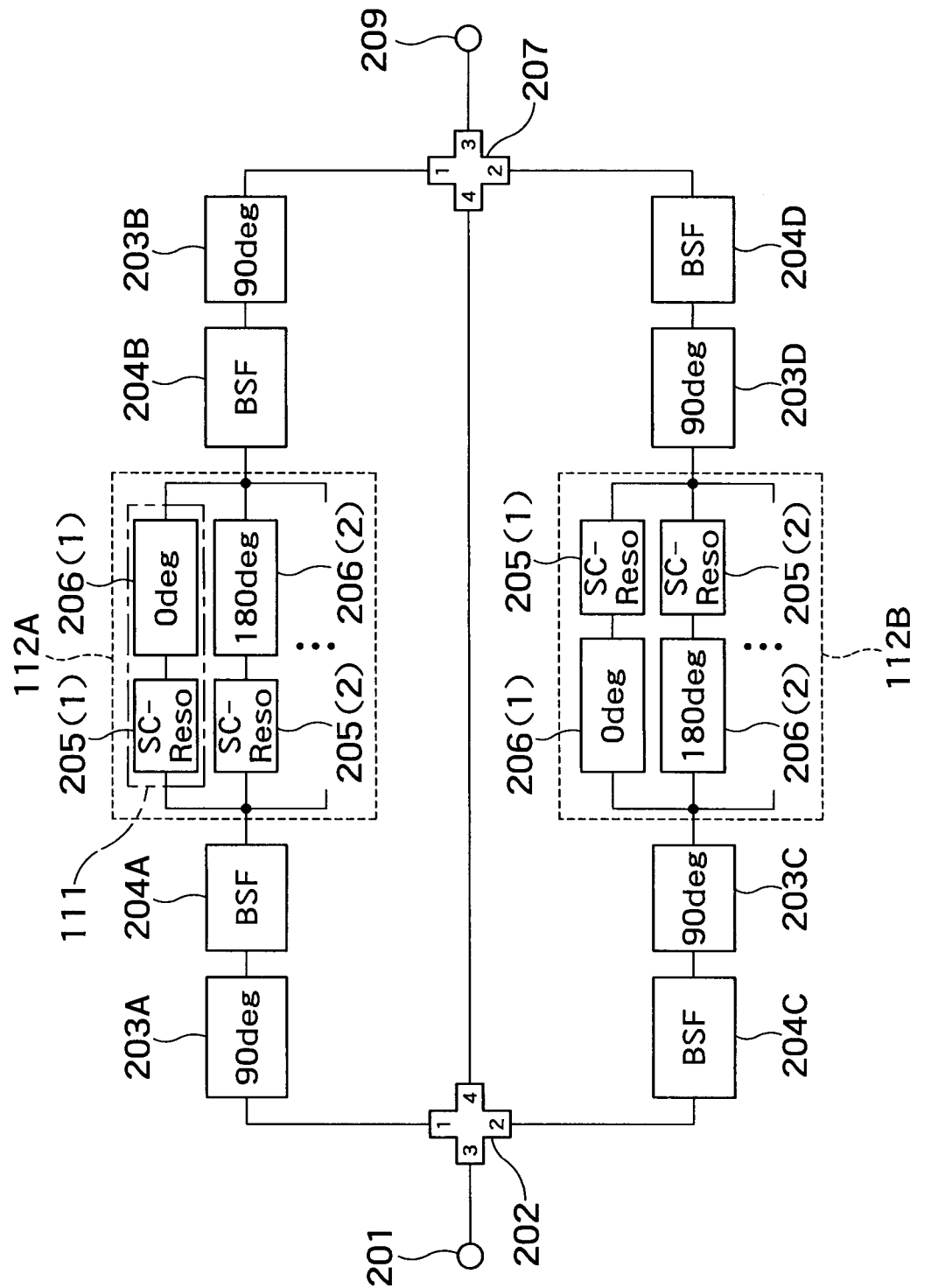
FIG. 21 is a view showing an example where the positional relation between the delay circuit and the band pass filter is reversed.

FIG. 21 shows an example where, in the filter circuit of FIG. 7, the positional relation between the delay circuit 203B and the band stop filter 204B is reversed and the positional relation between the delay circuit 203D and the band stop filter 204D is reversed. Even when the positional relation between the delay circuit and the band stop filter is reversed as thus described, it is possible to obtain the same effect as in the configuration of FIG. 7.

Figure 22:
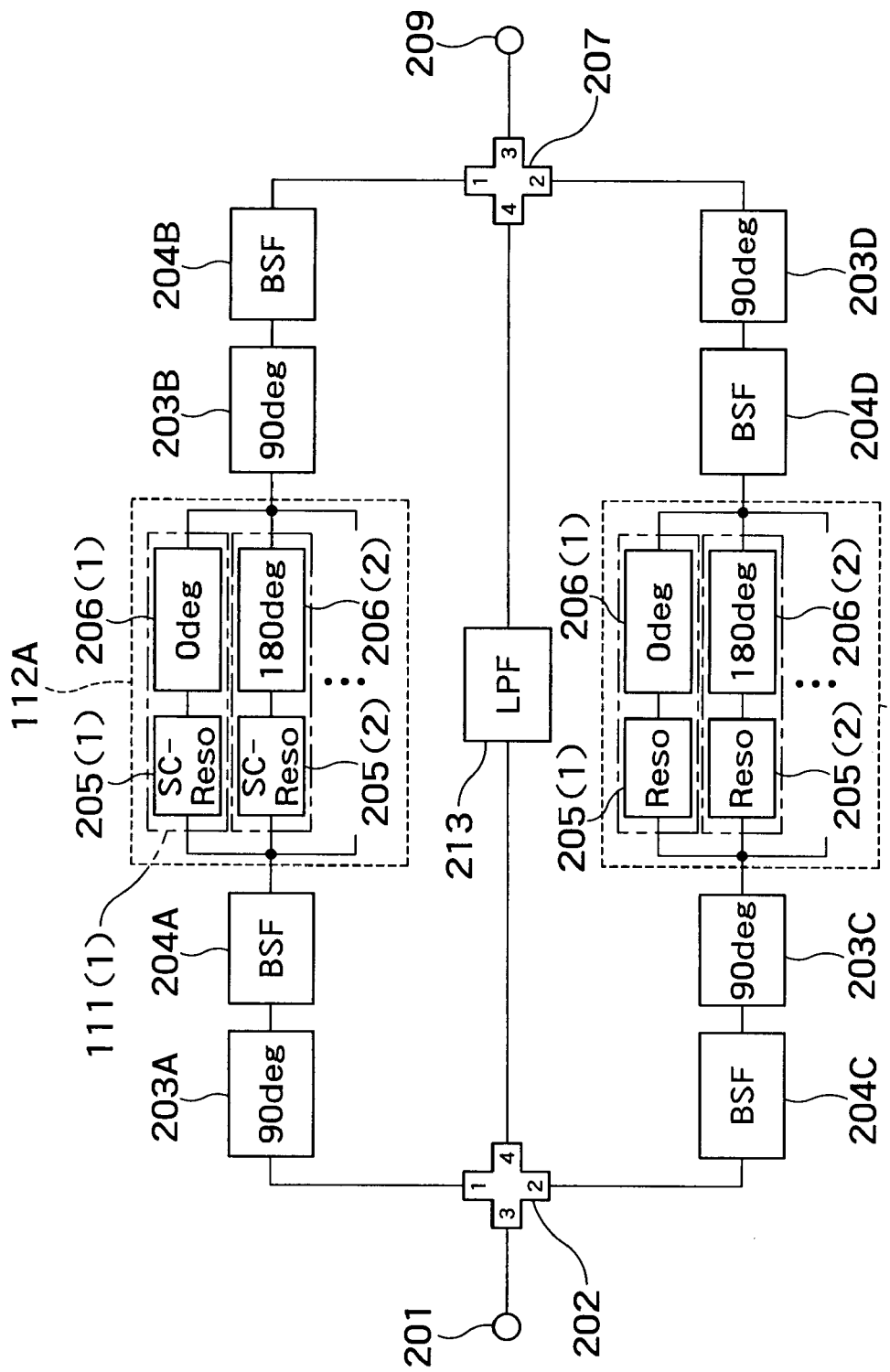
FIG. 22 is a view showing an example where a low pass filter is added between two four-port elements.

FIG. 22 shows an example where, in the filter circuit of FIG. 7, a low pass filter 213 is inserted between the terminal 4 of the four-port element 202 and the terminal 4 of the four-port element 207. With this low pass filter 213 inserted, it is possible to block transmission of high harmonic signals outside the stop band which were reflected on the band stop filters 204A and 204B, so as to attempt to improve the filter characteristic. In place of the low pass filter, a band stop filter for attenuating a specific frequency, a high pass filter for eliminating a leak on the low frequency side, or the like, may be inserted.

Figure 23:
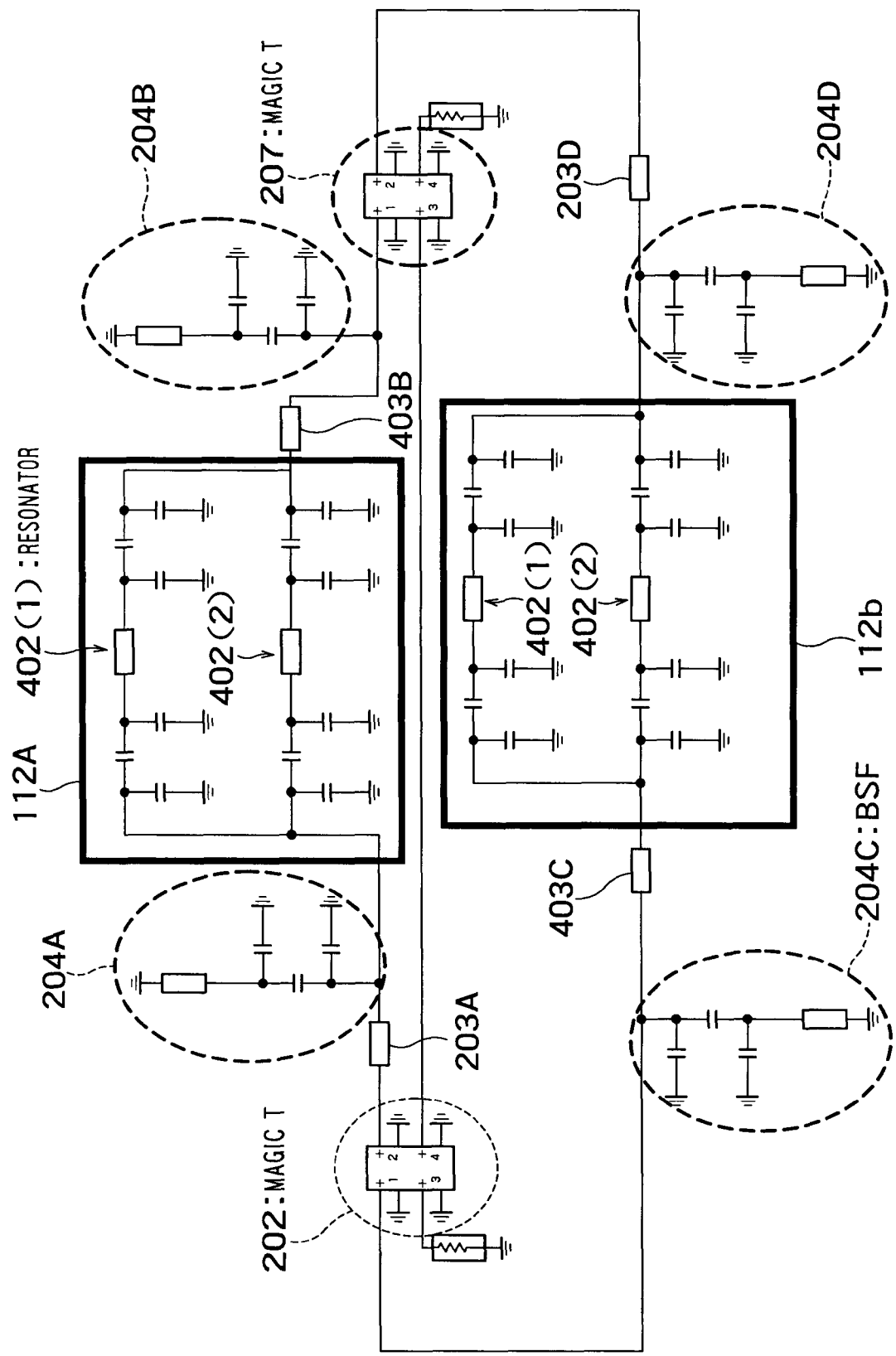
FIG. 23 is a view showing an example of a filter circuit where a simulation was performed.
Figure 24:
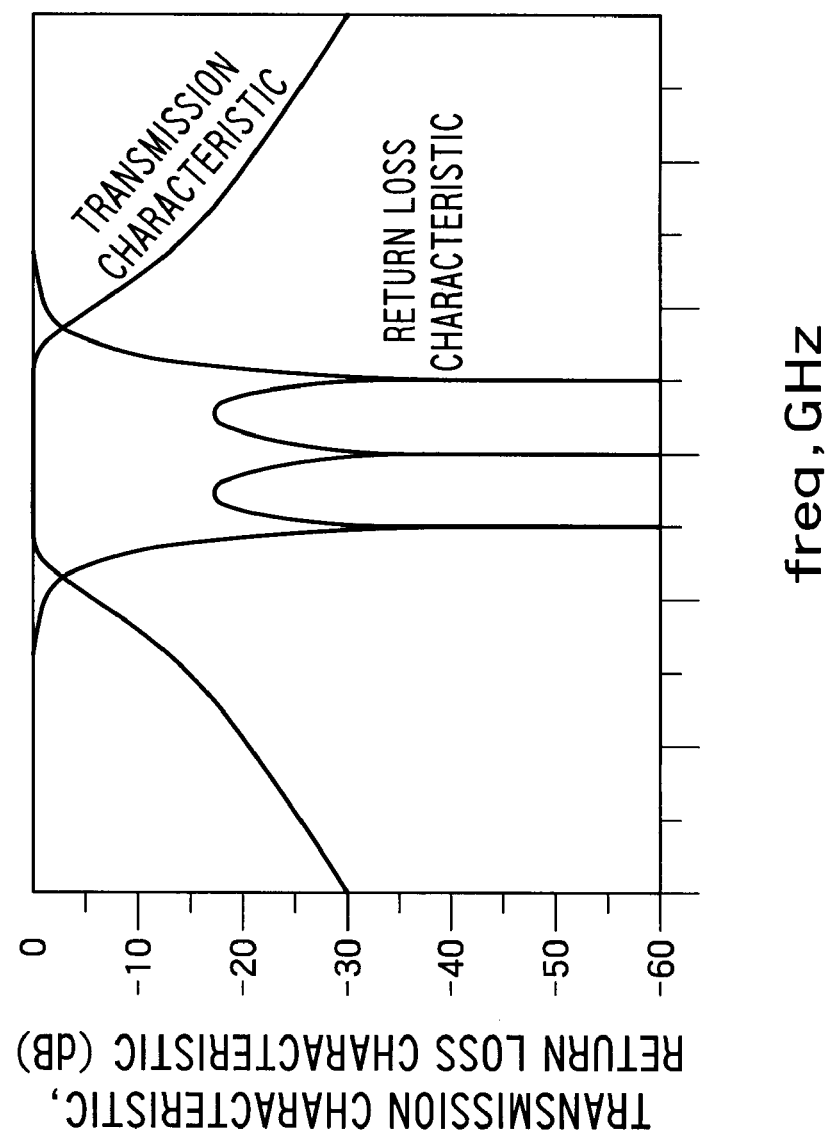
FIG. 24 is a view showing a frequency response characteristic of the filter circuit of FIG. 23.

FIG. 23 shows an example of a circuit having performed simulation for confirming the operation of the filter circuit of FIG. 11. Calculation was performed using parameters of $f_{C1}$=5.26 (GHz), $f_{L1}$=5.2551 (GHz), $f_{U1}$=5.2649 (GHz), a coupling coefficient Of $J_{bsf}$=0.036, and the external portion Q of $J_{qe}$=1600. The calculation result is shown in FIG. 24. A π-type circuit of capacitance is used as the coupling circuit, and a transmission line at 180 degrees is used for the resonator 402 and a transmission line at 90 degrees is used for the resonator of the band stop filter 204.

Figure 25:
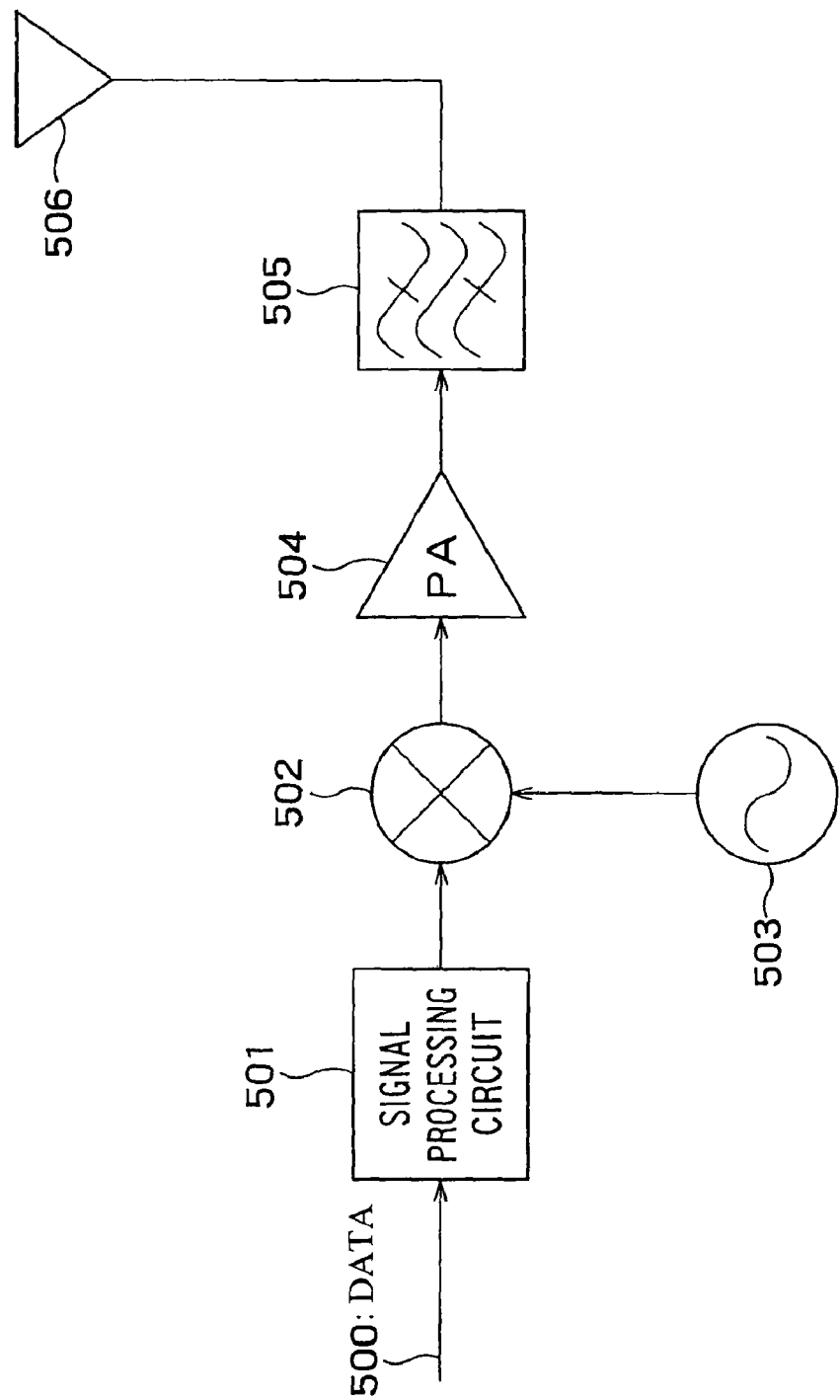
FIG. 25 is a constitutional view showing an example of radio communication apparatus.

FIG. 25 shows an example where the filter circuit as thus described is incorporated into radio communication apparatus. A transmission section of the radio communication apparatus is schematically shown. Data 500 to be transmitted is inputted into signal processing circuit 501, and subjected to processes such as digital-analog conversion, encoding and modulation, to generate transmission signals in a base band or an intermediate frequency (IF) band. The transmission signals generated by the signals processing circuit 501 are inputted into a frequency converter (mixer) 502 and multiplied by local signals from local signals generator 503 to be frequency-converted into signals in a radio frequency (RF) band, namely converted up. The RF signals outputted from the mixer 502 are amplified by a power amplifier 504 and inputted into a band limitation filter (transmission filter) circuit 505 according to the present embodiment. In the filter circuit 505, the signals are limited by a band limitation and an unnecessary frequency component is thus eliminated. Thereafter, the signals are released from an antenna 506 into the space as an electric wave.

What is claimed is:

1. A filter circuit, comprising:
an input terminal configured to input signals;
a first four-port element configured to
receive input signals from the input terminal at a terminal A, divide the input signals received at the terminal A, and send each divided signals from a terminal B and a terminal C, and
synthesize signals given to the terminal B and the terminal C and send synthesized signals from a terminal D;
a first band stop filter configured to have a stop band including a center frequency of the input signals and configured to reflect signals falling in the stop band out of the divided signals sent from the terminal B to the terminal B and pass signals falling outside the stop band, wherein the reflected signals are given to the terminal B;
a second band stop filter configured to have same stop band as the stop band of the first band stop filter and configured to reflect signals falling in the stop band out of the divided signals sent from the terminal C to the terminal C and pass signals falling outside the stop band, wherein the reflected signals are given to the terminal C;
a first resonator group circuit configured to pass signals falling in a desired band out of the signals having passed through the first band stop filter by use of a first plurality of resonators;
a second resonator group circuit configured to pass signals falling in the desired band out of the signals having passed through the second band stop filter by use of a second plurality of resonators each having same resonance frequency as that of each of the first plurality of resonators;

a second four-port element configured to
  receive the synthesized signals from the terminal D of the first four-port element at a terminal E, divide received signals, and send each divided signal from a terminal F and a terminal G, and
  synthesize signals given to the terminal F and the terminal G and send synthesized signals from a terminal H;
a third band stop filter configured to have same stop band as that of the first band stop filter and configured to pass the signals having passed through the first resonator group circuit to the terminal F and reflect the divided signals sent from the terminal F to the terminal F, wherein the signals having passed through the first resonator group circuit are given to the terminal F and the reflected signals are given to the terminal F;
a fourth band stop filter configured to have same stop band as that of the first band stop filter and configured to pass the signals having passed through the second resonator group circuit to the terminal G and reflect the divided signals sent from the terminal G to the terminal G, wherein the signals having passed through the second resonator group circuit are given to the terminal G and the reflected signals to the terminal G are given to the terminal G; and
an output terminal configured to output
  the synthesized signals sent from the terminal H.

2. The filter circuit according to claim 1, wherein transmission lines in the first and second resonator group circuits are made of a superconductor.

3. The filter circuit according to claim 1, wherein the first and second four-port elements are each a magic-T circuit or a rat-race circuit.

4. Radio communication apparatus, comprising:
a signal processing circuit, configured to perform a transmission process on transmission data to obtain transmission signals;
a power amplifier, configured to amplify the transmission signals;
a filter circuit according to claim 1, configured to perform a filter process on the amplified transmission signals; and
an antenna, configured to radiate the signals obtained from the filter circuit into the space as a radio wave.

* * * * *